(12) United States Patent
Chitrakar et al.

(10) Patent No.: US 12,356,480 B2
(45) Date of Patent: Jul. 8, 2025

(54) COMMUNICATION APPARATUS AND COMMUNICATION METHOD FOR MULTI-LINK SETUP AND LINK MAINTENANCE

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 350 days.

(21) Appl. No.: 17/910,279

(22) PCT Filed: Jan. 29, 2021

(86) PCT No.: PCT/SG2021/050044
§ 371 (c)(1),
(2) Date: Sep. 8, 2022

(87) PCT Pub. No.: WO2021/183045
PCT Pub. Date: Sep. 16, 2021

(65) Prior Publication Data
US 2023/0156840 A1      May 18, 2023

(30) Foreign Application Priority Data

Mar. 11, 2020   (SG) ............................. 10202002245Y

(51) Int. Cl.
*H04W 76/15*     (2018.01)
*H04B 17/309*    (2015.01)
*H04W 76/14*     (2018.01)

(52) U.S. Cl.
CPC .......... *H04W 76/15* (2018.02); *H04B 17/309* (2015.01); *H04W 76/14* (2018.02)

(58) Field of Classification Search
CPC ..... H04W 76/15; H04W 76/14; H04W 84/12; H04B 17/309
See application file for complete search history.

(56) References Cited

U.S. PATENT DOCUMENTS

2019/0150214 A1    5/2019   Zhou et al.
2019/0335454 A1*  10/2019   Huang ................ H04W 72/542
(Continued)

FOREIGN PATENT DOCUMENTS

WO    WO 2020040589 A1    2/2020

OTHER PUBLICATIONS

Chitrakar et al., "Multi-link Setup clarifications," Panasonic Corporation, IEEE 802.11-20/0751r1, May 11, 2020. (18 pages).
(Continued)

*Primary Examiner* — Tejis Daya
(74) *Attorney, Agent, or Firm* — Seed IP Law Group LLP

(57) ABSTRACT

Communication devices and methods for multi-link setup and link maintenance are provided. One exemplary embodiment provides a first station (STA) included in a first plurality of STAs affiliated with a first Multi-link Device (MLD), the first STA comprising: circuitry, which in operation, generates a request frame, the request frame comprising request information; and a transmitter, which in operation, transmits the request frame to a second STA to request a multi-link setup, wherein the second STA is included in a second plurality of STAs affiliated with a second MLD, and wherein the multi-link setup establishes one or more links between one or more STAs of the first plurality of STAs and corresponding one or more STAs of the second plurality of STAs based on the request information.

20 Claims, 31 Drawing Sheets

(56) References Cited

U.S. PATENT DOCUMENTS

| | | | | |
|---|---|---|---|---|
| 2021/0058868 A1* | 2/2021 | Cariou | ............. | H04W 52/0206 |
| 2021/0076437 A1* | 3/2021 | Kneckt | ............ | H04W 12/0471 |
| 2021/0289575 A1* | 9/2021 | Cherian | ................ | H04L 69/14 |
| 2021/0329500 A1* | 10/2021 | Cariou | ............... | H04W 74/002 |
| 2021/0360646 A1* | 11/2021 | Chu | .................. | H04W 72/569 |
| 2021/0400662 A1* | 12/2021 | Huang | ............... | H04W 72/542 |
| 2022/0240333 A1* | 7/2022 | Jang | .................... | H04W 76/11 |
| 2023/0024407 A1* | 1/2023 | Gan | .................... | H04W 48/08 |
| 2023/0354452 A1* | 11/2023 | Kim | .................... | H04W 48/16 |

OTHER PUBLICATIONS

International Search Report, mailed May 5, 2021, for International Patent Application No. PCT/SG2021/050044. (4 pages).

Jang et al., "Discussion on Multi-link Setup," LG Electronics, IEEE 802.11-19/1509r5, Sep. 16, 2019. (13 pages).

Jang et al., "Indication of Multi-link Information," LG Electronics, IEEE 802.11-20/0028r0, Jan. 13, 2020. (13 pages).

Extended European Search Reported dated Jul. 3, 2023, for the corresponding European Patent Application No. 21767259.1, 8 pages.

Huang et al., "MLD MAC Address and WM Address," doc.: IEEE 802.11-20/0054r0, Jan. 2020, 15 pages.

* cited by examiner

| Access Category (AC) | Minimum UL Link Margin (dB) | Minimum DL Link Margin (dB) |
|---|---|---|
| AC_VO (TID 6, 7) | 20 | 18 |
| AC_VI (TID 4, 5) | 15 | 13 |
| AC_BE (TID 0, 3) | 10 | 8 |
| AC_BK (TID 1, 2) | 5 | 3 |

| TID Map encoding | |
|---|---|
| Value | Mapped TIDs |
| 0 | 0 |
| 1 | 1 |
| 2 | 2 |
| 3 | 3 |
| 4 | 4 |
| 5 | 5 |
| 6 | 6 |
| 7 | 7 |
| 8 ~ 14 | reserved |
| 15 | All TIDs |

Figure 14D

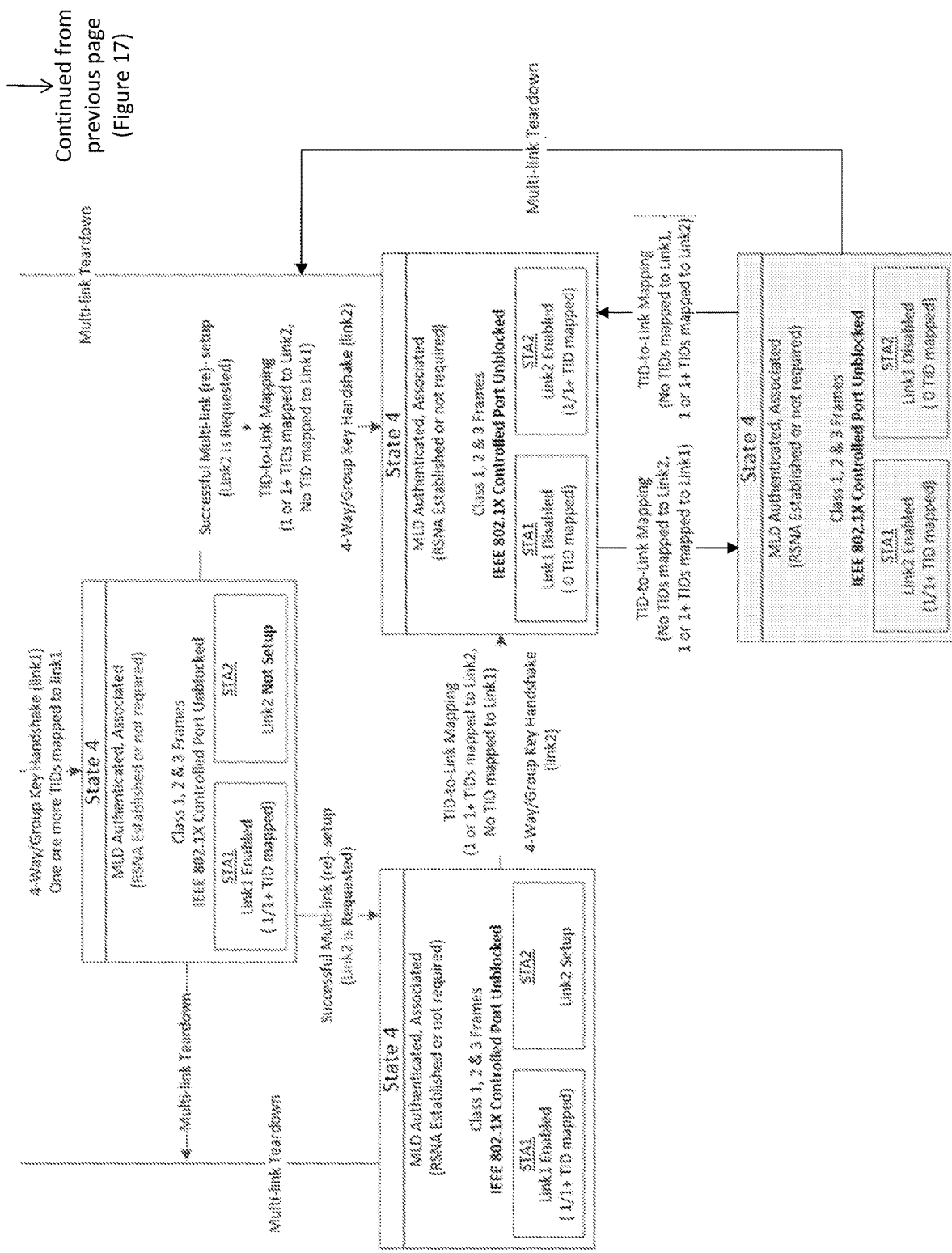

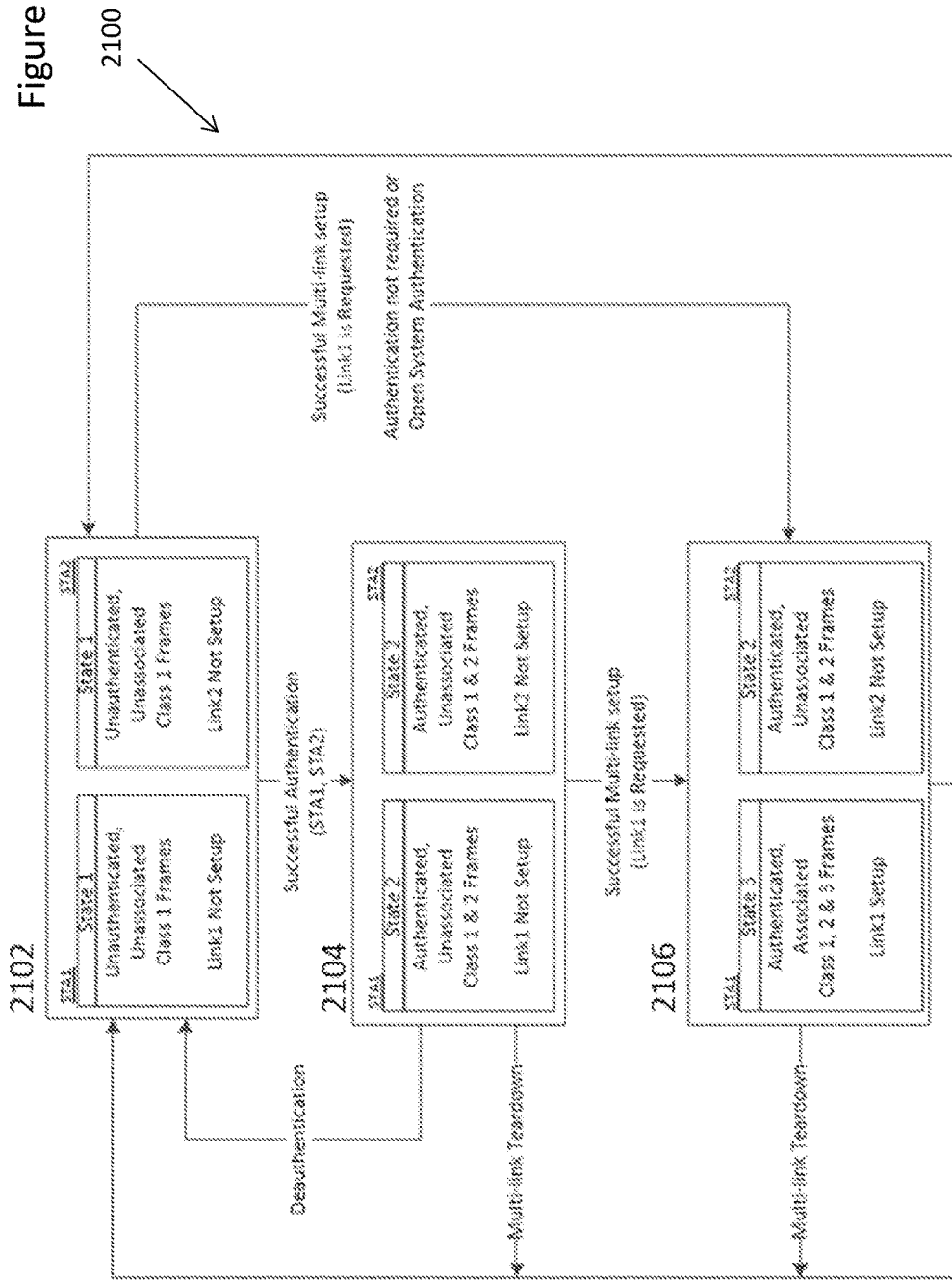
Figure 21
Continued on next page →

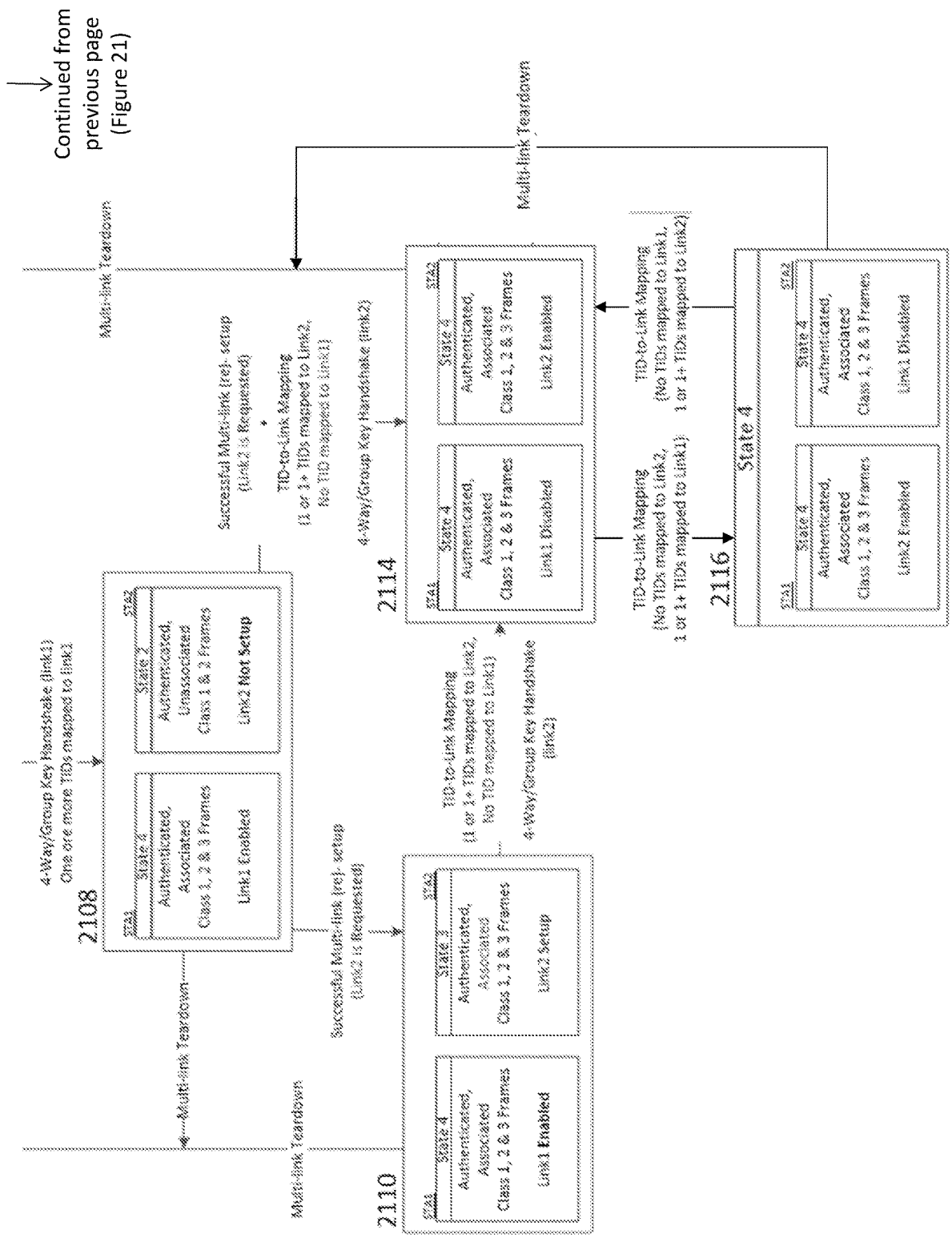

COMMUNICATION APPARATUS AND COMMUNICATION METHOD FOR MULTI-LINK SETUP AND LINK MAINTENANCE

BACKGROUND

1. Technical Field

The present embodiments generally relate to communication apparatuses, and more particularly relate to methods and apparatuses for multi-link setup and link maintenance.

2. Description of the Related Art

In today's world, communication devices are expected to wirelessly operate with the same capabilities as wired computing devices. For example, a user expects to be able to seamlessly watch a high definition movie streamed to the user's wireless communication device. This presents challenges for communication devices as well as the access points to which the communication devices wirelessly connect.

The Institute of Electrical and Electronics Engineers (IEEE) 802.11 group has recently formed the 802.11 Task Group (TG) to address these challenges. Multi-link operation in the 2.4 GHz, 5 GHz and 6 GHz frequency bands has been identified as a key candidate technology for such communication. Multi-channel aggregation over multiple links is a natural way to create multi-fold increase in communication data throughput.

In order to enable such multi-link operations between an access point (AP) multi-link device (MLD) and a non-AP MLD, multi-link setup may be performed over one of the supported links to establish association for affiliated stations (STAs) in one or more links.

SUMMARY

One non-limiting and exemplary embodiment facilitates providing a first station (STA) included in a first plurality of STAs affiliated with a first Multi-link Device (MLD), the first STA comprising: circuitry, which in operation, generates a request frame, the request frame comprising request information; and a transmitter, which in operation, transmits the request frame to a second STA to request a multi-link setup, wherein the second STA is included in a second plurality of STAs affiliated with a second MLD, and wherein the multi-link setup establishes one or more links between one or more STAs of the first plurality of STAs and corresponding one or more STAs of the second plurality of STAs based on the request information.

Another non-limiting and exemplary embodiment facilitates providing a second STA included in a second plurality of STAs affiliated with a second Multi-link Device (MLD), the second STA comprising: a receiver, which in operation, receives a request frame from a first STA, wherein the first STA is included in a first plurality of STAs affiliated with a first MLD, and wherein the request frame comprises request information and is requesting for a multi-link setup that establishes one or more links between one or more STAs of the first plurality of STAs and corresponding one or more STAs of the second plurality of STAs based on the request information; and a transmitter, which in operation, transmits a response frame to the first STA to inform the result of the multi-link setup, wherein the response frame carries information of the one or more links that have been established between the one or more STAs of the first plurality of STAs and the corresponding one or more STAs of the second plurality of STAs.

Another non-limiting and exemplary embodiment facilitates providing a communication method comprising: generating a request frame at a first STA included in a first plurality of STAs affiliated with a first MLD, the request frame comprising request information; and transmitting the request frame to a second STA to request a multi-link setup, wherein the second STA is included in a second plurality of STAs affiliated with a second MLD, and wherein the multi-link setup establishes one or more links between one or more STAs of the first plurality of STAs and corresponding one or more STAs of the second plurality of STAs based on the request information.

It should be noted that general or specific embodiments may be implemented as a system, a method, an integrated circuit, a computer program, a storage medium, or any selective combination thereof. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 14D depicts a TID map encoding table in accordance with a first embodiment.

FIG. 21 depicts an alternative state transition diagram in accordance with a second embodiment.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the embodiments or the application and uses of the embodiments. Furthermore, there is no intention to be bound by any theory presented in the preceding Background or this Detailed Description. Furthermore, other desirable features and characteristics will become apparent from the subsequent detailed description and the appended claims, taken in conjunction with the accompanying drawings and this background of the disclosure.

Generally, upon completion of a Multi-link Setup between an AP MLD and non-AP MLD, the concerned links may be in one of the following states:

Set up (or established): AP MLD and non-AP MLD have all the information to enable data operation with each other. This state may be equivalent to State 3 of the state transition diagram for nonmesh STAs, whereby IEEE 802.1X controlled port is blocked (i.e. only Extensible Authentication Protocol over LANs (EAPOL) Data frames are allowed, other Data frames are not allowed).

Enabled (Activated): Both MLDs agree to start data operation on the link. E.g. at least one traffic identifier (TID) is mapped to the link, robust security network association (RSNA) has been completed for the link. May be equivalent to State 4 of the state transition diagram for nonmesh STAs whereby IEEE 802.1X controlled port is unblocked (i.e. all Data frames are allowed).

Disabled: In this state, the links may be set up but data operation is disabled, or Setup and RSNA is completed but no TID mapped to the links, or MLDs may ignore frames received on the links.

It is important to clarify how MLDs maintain the link states and to define the rules for the allowed/disallowed frames and MLD's related actions for each link state.

Figure 1:
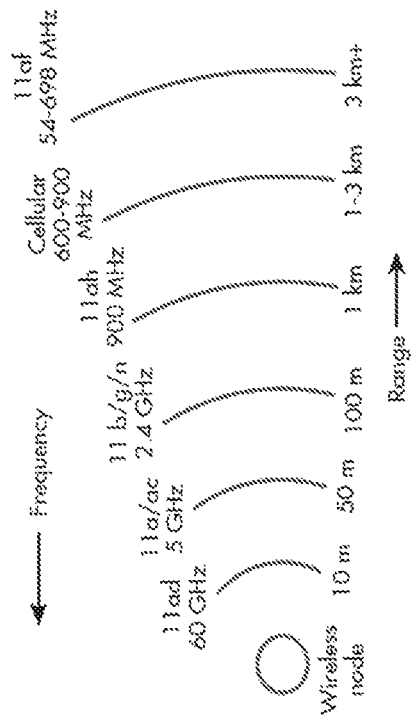
FIG. 1 illustrates a relationship between coverage frequency and range of a wireless node.

Further, an MLD's different links may have different range/channel conditions. Referring to FIG. 1 which depicts a relationship between coverage frequency and range of a wireless node, 11 af coverage (54-698 MHz) has a coverage range of 3 km and more, cellular coverage (600-900 MHz) has a range of 1-3 km, 11 ah coverage (900 MHz) has a range of 1 km, 11/b/g/n coverage (2.4 GHz) has a range of 100 m, 11a/ac coverage (5 GHz) has a range of 50 m, and 11 ad coverage (60 GHz) has a range of 10 m. If setup frames for a multi-link setup is exchanged in a link that is in a lower frequency band (e.g. 2.4 GHz band), the MLD may not be within range in the other links that are in higher frequency bands (e.g. 5 GHz or 6 GHz). Further, even if an MLD is in range in the other supported links, some links may not be of good quality e.g. due to excessive overlapping basic service set (OBSS) interference, frequency-dependent fading etc., or due to co-existence interference (e.g. due to Bluetooth in the 2.4 GHz band etc.) and hence may not be suitable for link enablement.

Indeed, a non-AP MLD's link capabilities alone may not provide enough information to setup a link. Some (potential) links/STAs of an MLD may be in a fourth state after completing Multi-link setup procedure (i.e. Not setup (Unestablished/Unavailable)). Frame exchanges are therefore not possible on the link. However, such links may become available for setup if conditions change (e.g. non-MLD moves nearer to AP MLD).

Therefore, links should not be set up or established based on capabilities information alone. The non-AP MLD should be able to choose which links are set up. Also, channel quality of a link (especially second and subsequent links) needs to be checked prior to establishing/enabling the link (either during the Multi-link Setup itself or during subsequent enabling operations). Channel quality of enabled links also needs to be checked periodically to ensure the link is alive and suitable for the TID(s) mapped to it.

Accordingly, the present invention seeks to address the above-mentioned problems.

Figure 2:
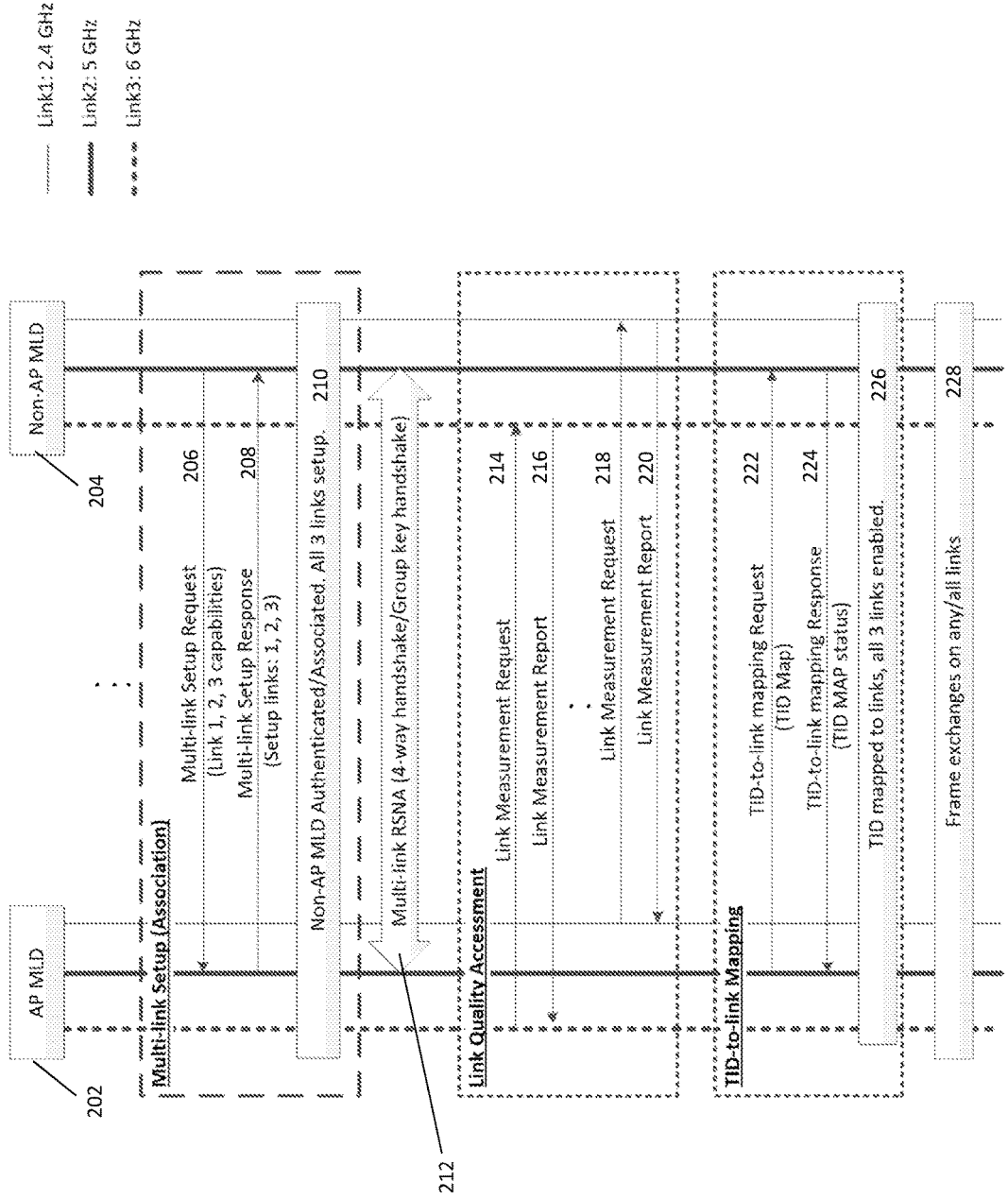
FIG. 2 depicts communication flow between an AP MLD and a non-AP MLD for multi-link setup, link quality assessment, traffic identifier (TID)-to-link mapping and communication thereafter in accordance with an example.

FIG. 2 depicts communication flow between an AP MLD 202 and a non-AP MLD 204 for multi-link setup, link quality assessment, traffic identifier (TID)-to-link mapping and communication thereafter in accordance with a typical solution for addressing the above-mentioned issues. During multi-link setup, a multi-link setup request 206 is transmitted from the non-AP MLD 204 to the AP MLD 202 on link 2. The multi-link setup request comprises information on the link capabilities of links 1, 2 and 3. In response to the request, the AP MLD 202 sets up the requested links 1, 2 and 3, and then transmits a multi-link setup response 208 to the non-AP MLD 204 informing the setting up of the links. At 210, the non-AP MLD 204 is now authenticated/associated, and the 3 links are now setup. A multi-link RSNA (4-way handshake/group key handshake) between the AP MLD 202 and non-AP MLD 204 is then performed on link 2. It will be appreciated that each of links 1, 2 and 3 is connecting an affiliated STA of the AP MLD 202 and an affiliated STA of the non-AP MLD 204, such that these STAs are transmitting or receiving any data or frames on the concerned link.

After completing the multi-link setup, the AP MLD 202 may initiate a link quality assessment procedure to check the quality of the setup links which may be used to decide the TID-to-link mapping. The AP MLD 202 may send a link measurement request 214 on link 1 and a link measurement request 218 on link 3 in order to assess the link quality of the other links besides link 2. In response, the non-AP MLD 204 transmits a link measurement report 216 and a link measurement report 220 to the AP MLD 202 over link 1 and link 3 respectively. The link measurement report 216 includes information of the link quality for link 1 and link measurement report 220 includes information of the link quality for link 3. The link quality assessment may also be performed prior to multi-link setup.

Thereafter, the AP MLD 202 may decide the TIDs to be mapped to each link based on the link quality assessment and initiate TID-to-link mapping by transmitting a TID-to-link mapping request 222 to the non-AP MLD 204 on link 2. The TID-to-link mapping request includes a TID map indicating how each TID is mapped to each link. In response, the non-AP MLD 224 transmits a TID-to-link mapping response 224 to the AP MLD 202 on link 2 to indicate the status of the TID mapping. After all 3 links are enabled and the TIDs are mapped to the links (at 226), frame exchanges may then proceed on any/all of the 3 links (at 228).

The above solution has a few shortcomings. For instance, the links are set up only based on capabilities information (i.e. included in the multi-link set up request 206). Further, this is an AP centric solution; that is, STAs do not have a say in which links are set up or enabled.

During Multi-link Setup, additional links (i.e. links other than the one used to exchange the Multi-link Setup frames) should not be set up (established) based on capabilities information alone. A first MLD can request a second MLD whose links are to be set up as part of a Multi-link Setup, independent of the link capabilities e.g. using a Setup Request field in a Multi-link Setup Request frame. The MLD may also include information about link quality (e.g. Uplink/Downlink (UL/DL) link margin, UL/DL Path Loss etc.) of the requested links. Further, the second MLD will only set up the links requested by the first MLD during the Multi-link Setup (e.g. assignment of association identifiers (AIDs), inclusion in the Association Record etc.). The links that are set up may be called a Multi-link set. The second MLD may also factor in the information about the link quality to decide whether or not to setup/enable a link, especially if there are TID restrictions on some links. The information may also be used for subsequent TID-to-link mapping (i.e. link enabling/disabling).

Figure 3:
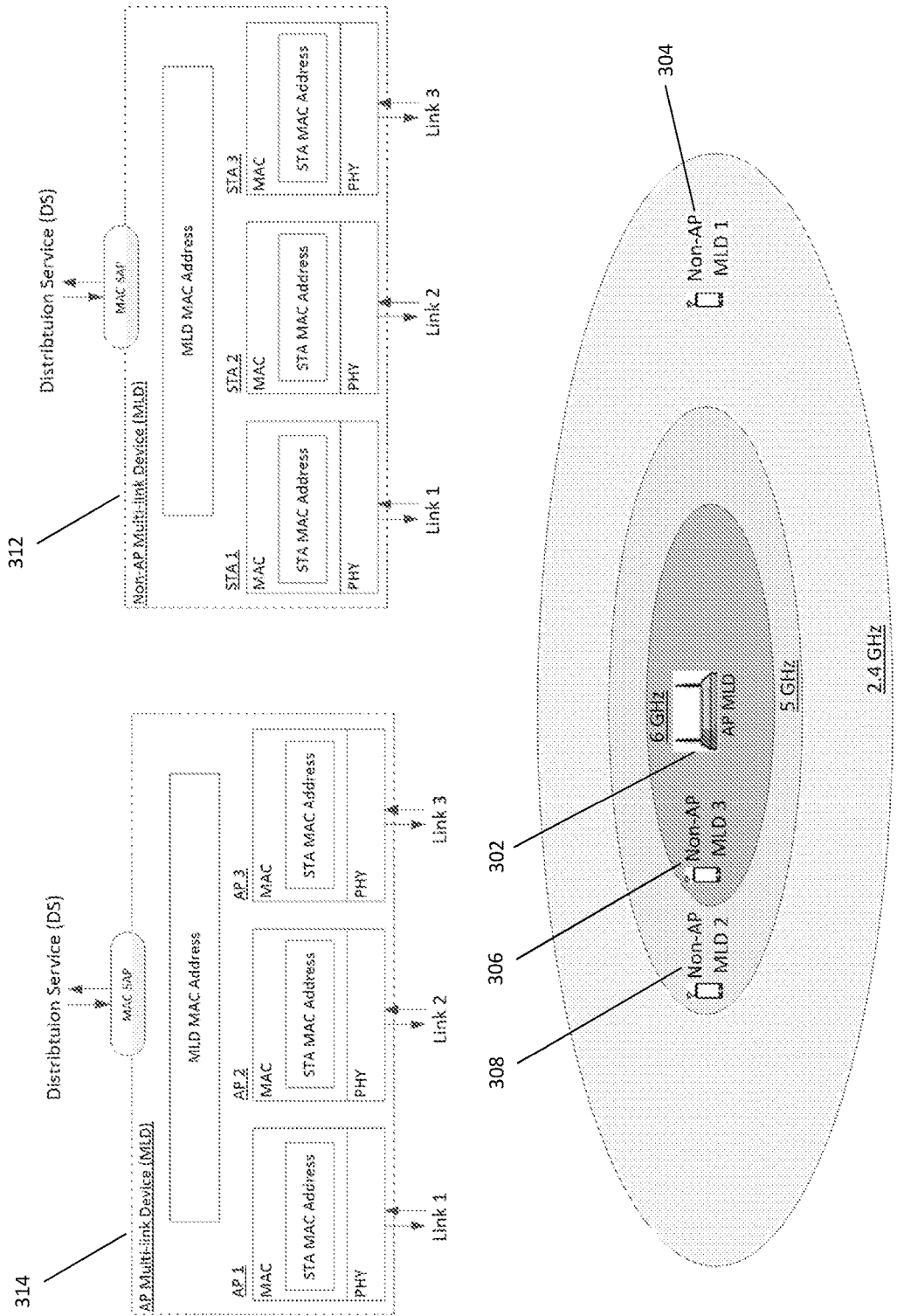
FIG. 3 depicts an illustration of an AP MLD with multiple basic service sets (BSSs) and multiple non-AP MLDs in range of the BSSs in accordance with various embodiments.

FIG. 3 depicts an illustration 300 of an AP MLD 302 with multiple BSSs and non-AP MLDs 304, 306 and 308 in range of the BSSs in accordance with various embodiments. The AP MLD 302 may be illustrated as schematic 314, comprising a MAC-service access point (MAC-SAP) for accessing the distribution service (DS), an MLD MAC address that identifies the AP MLD, and three affiliated APs (i.e. AP1, AP2 and AP3). Each AP has its own STA MAC address at the MAC layer and is connected via a link at the PHY layer for transmitting and receiving data (i.e. AP1 is connected via link 1, AP2 is connected via link2 and AP3 is connected via link 3).

Further, the non-AP MLDs 304, 306 and 308 may be illustrated as schematic 316, comprising a MAC-SAP for accessing the DS, an MLD MAC address that identifies the non-AP MLD, and three affiliated STAs (i.e. STA1, STA2 and STA3). Each STA has its own STA MAC address at the MAC layer and is connected via a link at the PHY layer for transmitting and receiving data (i.e. STA1 is connected via link 1, STA2 is connected via link2 and STA3 is connected via link 3).

The AP MLD 302 sets up multiple (multi-link) BSSs, one per affiliated AP. Each BSS has its own BSSID, beacons and may have different coverage. For example, AP1 is operating the BSS on 6 GHz; AP2 is operating the BSS on 5 GHz and AP3 is operating the BSS on 2.4 GHz. The coverage of different APs may be different (due to frequency bands, transmission (Tx) power etc.). Coverage may also depend on the modulation and coding scheme (MCS), i.e. MCS 0 may have much larger coverage compared to MCS 9. Further, a non-AP MLD may be in range of one or more such BSSs. For example, only STA1 of Non-AP MLD 304 is within coverage of AP MLD 302 via AP1; only STA1 and STA2 of non-AP MLD 306 is within coverage of AP MLD 302 via AP1 and AP2, while all 3 STAs of non-AP MLD 308 is within coverage of AP MLD 302 (i.e. all three APs).

An AP MLD is an entity that has a distribution system access function (DSAF), which enables access to the DS, via wireless medium (WM) for associated non-AP MLDs (with one or more affiliated STAs) as well as legacy STAs. Different affiliated STAs of a non-AP MLD may connect to different APs of an AP MLD to gain access to the DS. However, all APs of an AP MLD may go through the same single MAC-SAP and DSAF to connect to the DS.

Figure 4:
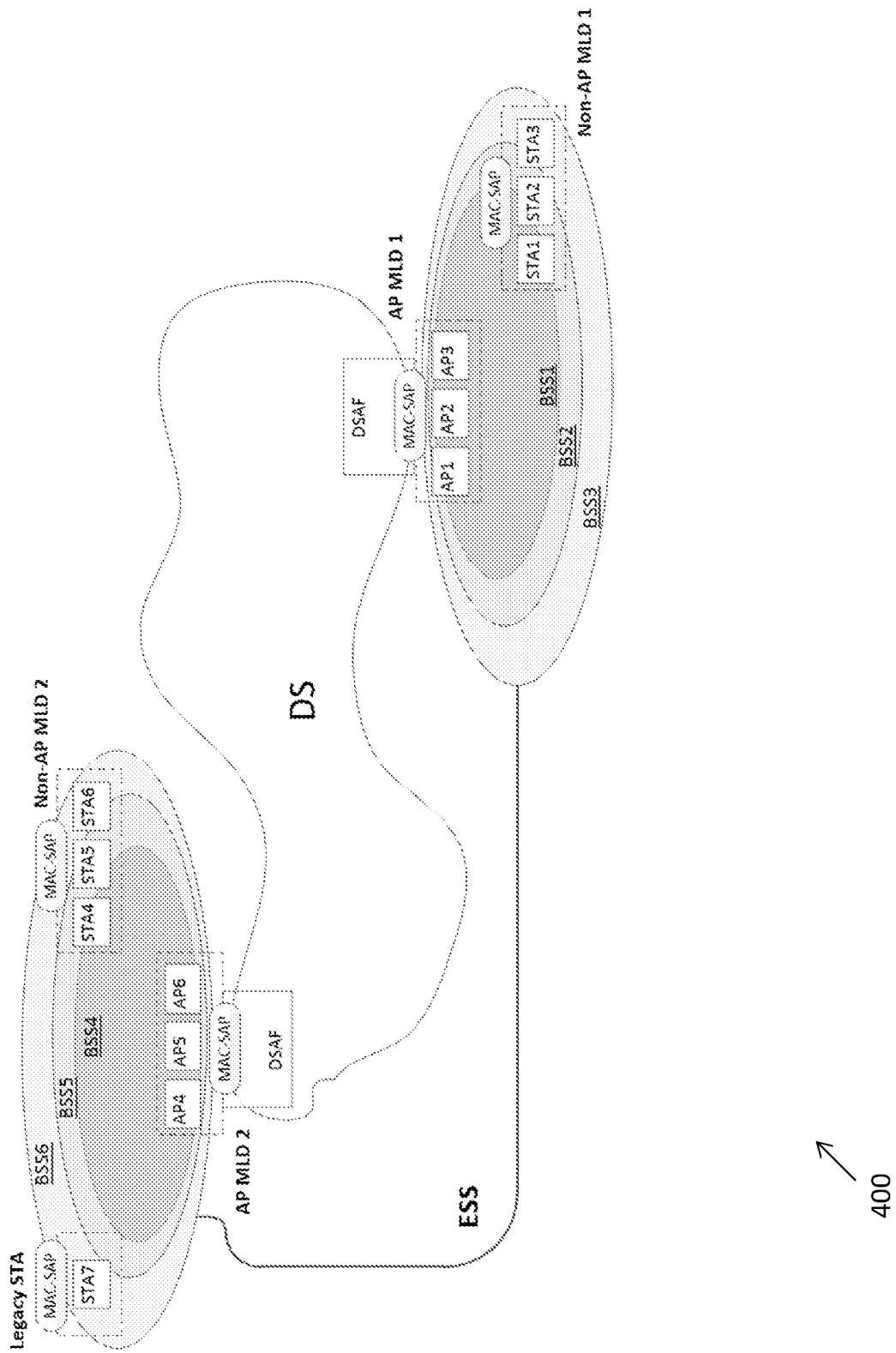
FIG. 4 depicts an illustration of an extended service set (ESS) with MLDs in accordance with various embodiments.

This network forms an extended service set (ESS) 400 which is illustrated in FIG. 4. STA1, STA2 and STA3 affiliated with non-AP MLD1 may connect to, for example, AP1, AP2 and AP3 respectively of AP MLD1 to gain access to the DS. AP1, AP2 and AP3 may go through the MAC-SAP and DSAF of AP MLD1 to connect to the DS. Further, STA4, STA5 and STA6 affiliated with non-AP MLD2 may connect to, for example, AP4, AP5 and AP6 respectively of AP MLD2 to gain access to the DS. AP4, AP5 and AP6 may go through the MAC-SAP and DSAF of AP MLD2 to connect to the DS. Traditionally, a legacy STA such as STAT gains access to the DS by associating with an AP, and it may continue to do so even with an AP MLD by associating with any one of the affiliated AP of the AP MLD e.g. AP4 of the AP MLD2. However, for a non-AP MLD, the association process may be replaced by a Multi-link Setup procedure as will be further described below. A Multi-link setup performed between any one pair of affiliated STA and an affiliated AP may provide access to the DS for one or more affiliated STAs of the non-AP MLD.

Figure 5:
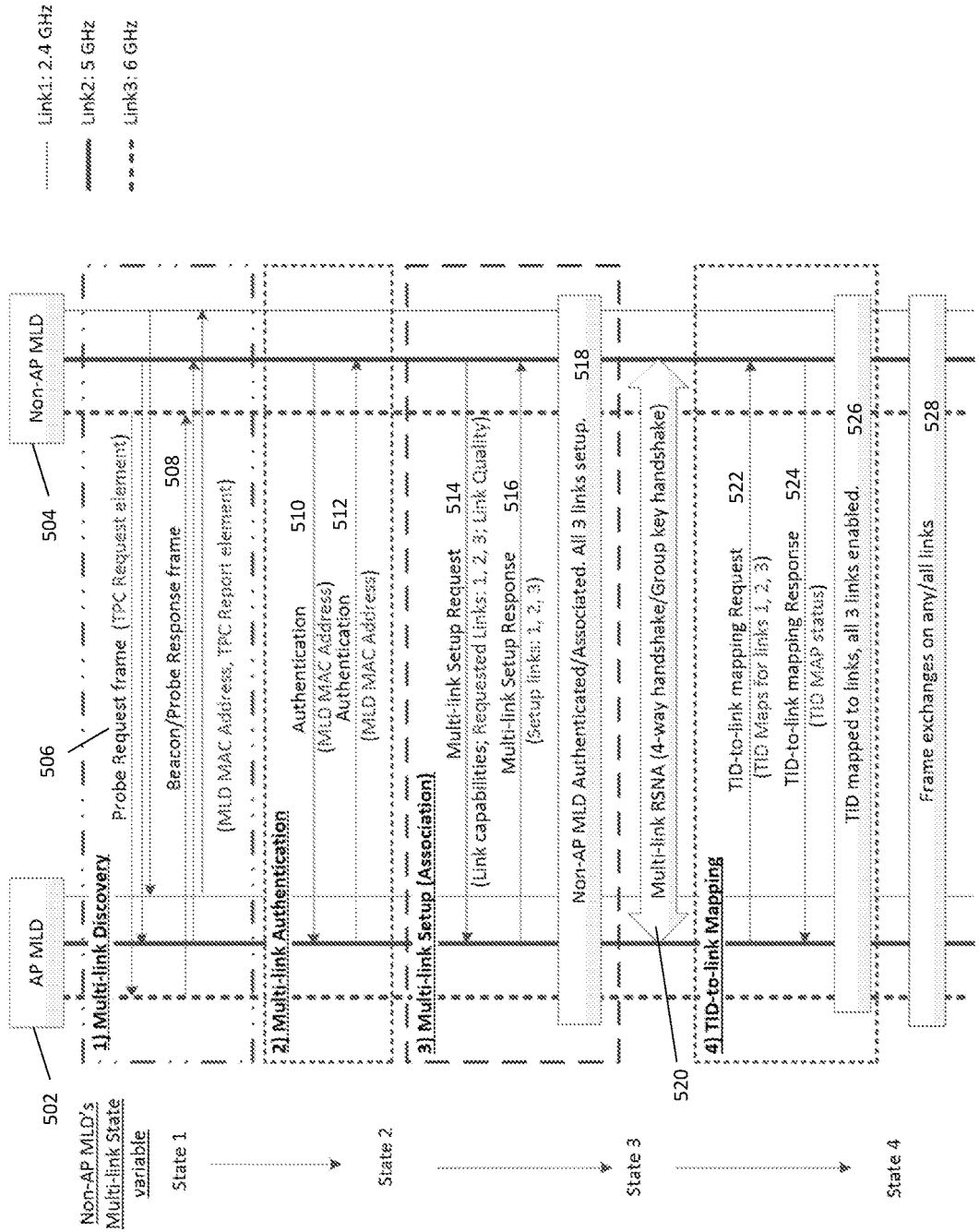
FIG. 5 depicts communication flow between an AP MLD and a non-AP MLD for multi-link discovery, authentication, setup, TID-to-link mapping and communication thereafter in accordance with a first embodiment.

FIG. 5 depicts communication flow between an AP MLD and a non-AP MLD for multi-link discovery, authentication, setup, TID-to-link mapping and communication thereafter in accordance with the first embodiment. First, during a multi-link discovery phase, non-AP MLD 504 checks quality of links 1, 2 and 3 by transmitting a probe request frame 506 on each link to AP MLD 502. The probe request frame 506 may comprise a transmit power control (TPC) request element. The AP MLD 502 may, in response to receiving the probe request frame 506, transmit a beacon or probe response frame 508 on each link to the non-AP MLD 504. The beacon or probe response frame 508 may comprise an MLD MAC address of the AP MLD 502 as well as a TPC report element. After completing the multi-link discovery phase, the non-AP MLD may be considered to be at a state 1.

After the discovery phase, the non-AP MLD 504 may initiate multi-link authentication by transmitting an authentication request 510 to the AP MLD 502 on, for example, link 2. The authentication request may comprise information of the MLD MAC address of non-AP MLD 504. In response to receiving the authentication request 510, the AP MLD 502 may transmit an authentication response 512 to the non-AP MLD 504 on the same link 2. The authentication response may comprise information on the MLD MAC address of AP MLD 502. Multi-link authentication may be optional for Open Systems with Extensible Authentication Protocol (EAP) but is mandatory for SAE and Fast Initial link setup (FILS). The MLD MAC addresses may be used during the authentication process for SAE and FILS. After authentication is successfully completed, the non-AP MLD's multi-link state may be changed to a state 2.

After authentication is successfully completed, multi-link setup/association may be initiated by the non-AP MLD 504 by transmitting a multi-link setup request 514 to the AP MLD 502 on, for example, link 2. The multi-link setup request 514 may comprise the link capabilities of links 1, 2 and 3 as well as request information that identify the affiliated STAs of the non-AP MLD 504 for which links are to be set up i.e. links 1, 2 and 3 in this case. The request information may also comprise information about quality of wireless channels for each of the links 1, 2 and 3. The request information may further comprise information about traffic characteristics that is expected for each of the links 1, 2 and 3, the traffic characteristics being one of Traffic identifier (TID), payload size, delay bound, data rate, minimum PHY rate, etc.

In response to the request and based on the request information, the AP MLD 502 sets up the requested links 1, 2 and 3, and then transmits a multi-link setup response 516 to the non-AP MLD 504 informing the setting up of the links. At 518, the non-AP MLD 504 is now authenticated/associated, and the 3 requested links are now setup. After set up is successfully completed, the non-AP MLD's multi-link state may be changed to a state 3. A multi-link RSNA (4-way handshake/group key handshake) between the AP MLD 502 and non-AP MLD 504 may then be performed on, for example, link 2.

After completing the multi-link setup, the AP MLD 502 may initiate TID-to-link mapping by transmitting a TID-to-link mapping request 522 to the non-AP MLD 504 on, for example, link 2. The TID-to-link mapping request 522 may comprise a TID map for the requested links 1, 2 and 3 indicating how each TID is mapped to each link. In response, the non-AP MLD 524 may transmit a TID-to-link mapping response 524 to the AP MLD 502 on link 2 to indicate the status of the TID mapping. After all 3 links are enabled and the TIDs are mapped to the links (at 526), frame exchanges may then proceed on any/all of the 3 links (at 528). After the TID-to-link mapping is completed at 526, the non-AP MLD's multi-link state may be changed to a state 4. TID-to-link mapping may be optional and initial mapping may also be performed as part of the Multi-link Setup step. By default all TIDs are mapped to all setup links.

It will also be appreciated that each of links 1, 2 and 3 is connecting an affiliated AP of the AP MLD 502 and an affiliated STA of the non-AP MLD 504, such that these STAs are transmitting or receiving any data or frames on the concerned link. Prior to transmitting the setup request 514, the affiliated STAs of the non-AP MLD 504 may be configured to collect information about quality of wireless channels for each of the one or more links, wherein the quality of wireless channel comprises one or more of link margin, path loss, receive signal strength indication (RSSI) and receive channel power indication (RCPI).

Figure 6:
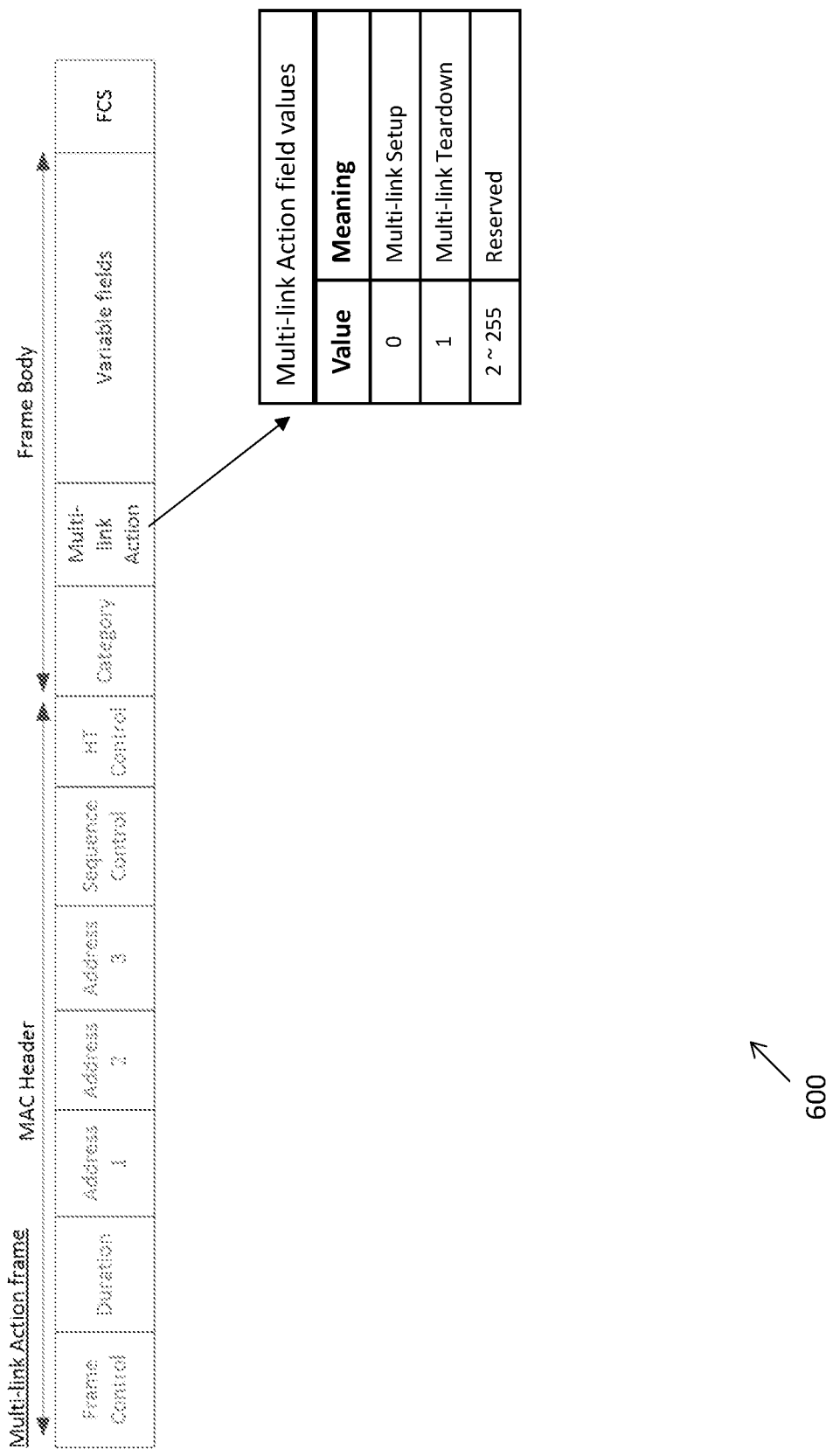
FIG. 6 depicts an illustration of a multi-link action frame in accordance with a first embodiment.

A new (class 1) action frame may be defined for the multi-link operations shown in FIG. 5. FIG. 6 depicts an illustration of a new multi-link action frame 600 in accordance with the first embodiment. The multi-link action frame 600 may comprise a frame control field, a duration field, three address fields, a sequence control field, a HT control field, a category field, a multi-link action field, variable fields and a frame check sequence (FCS) field. The multi-link action field may have a value of 0 indicating that the action frame is for a multi-link setup, or a value of 1 indicating that the action frame is for a multi-link teardown. Values 2-255 may be reserved.

Figure 7:
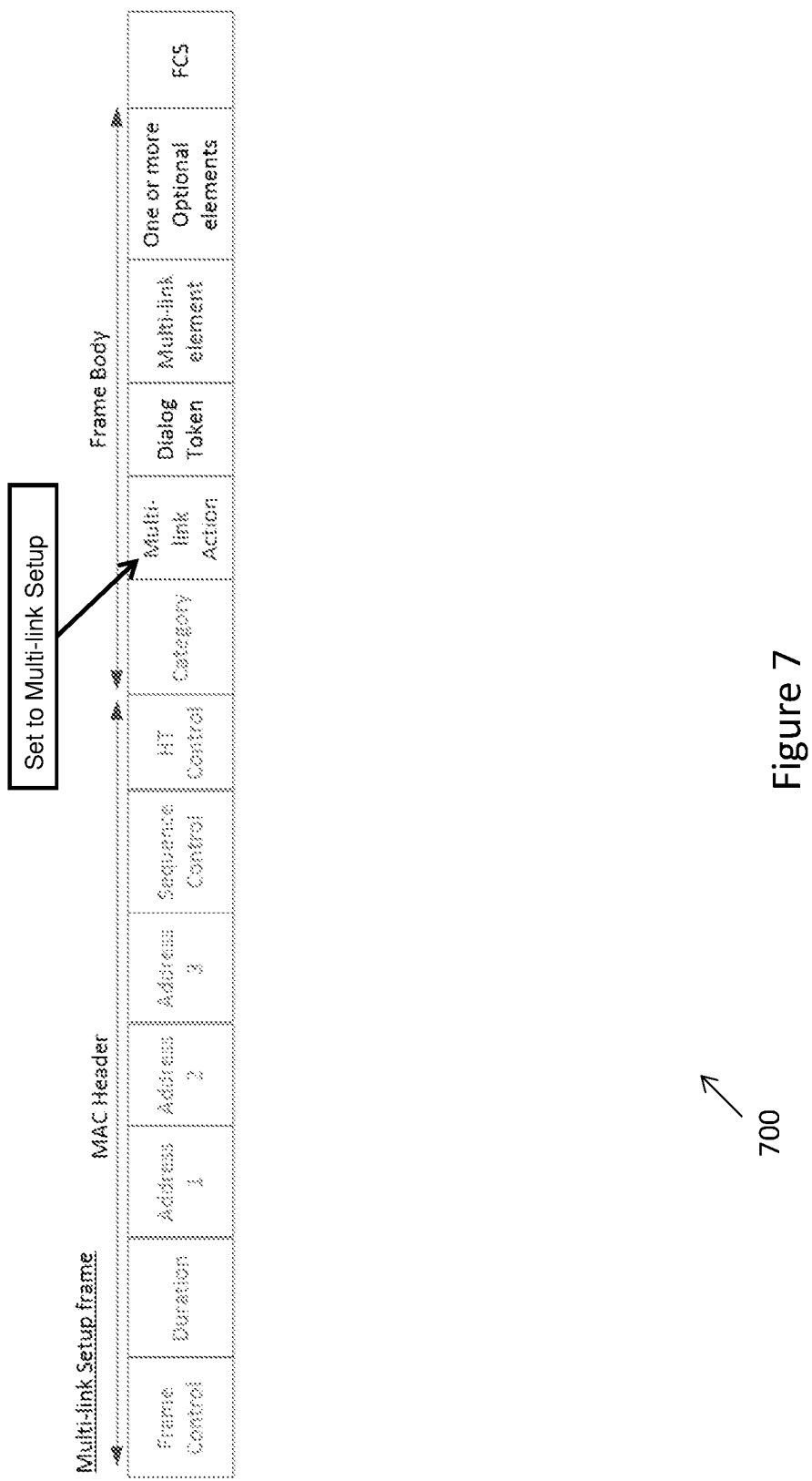
FIG. 7 depicts an illustration of a multi-link setup frame in accordance with a first embodiment.

FIG. 7 depicts an illustration of a multi-link setup frame 700 in accordance with the first embodiment. The multi-link setup frame 700 may comprise a frame control field, a duration field, three address fields, a sequence control field, a HT control field, a category field, a multi-link action field which is set to a value of 0 (i.e. set to multi-link setup), a dialog field, a multi-link element field, one or more optional element fields and a FCS field.

Figure 8:
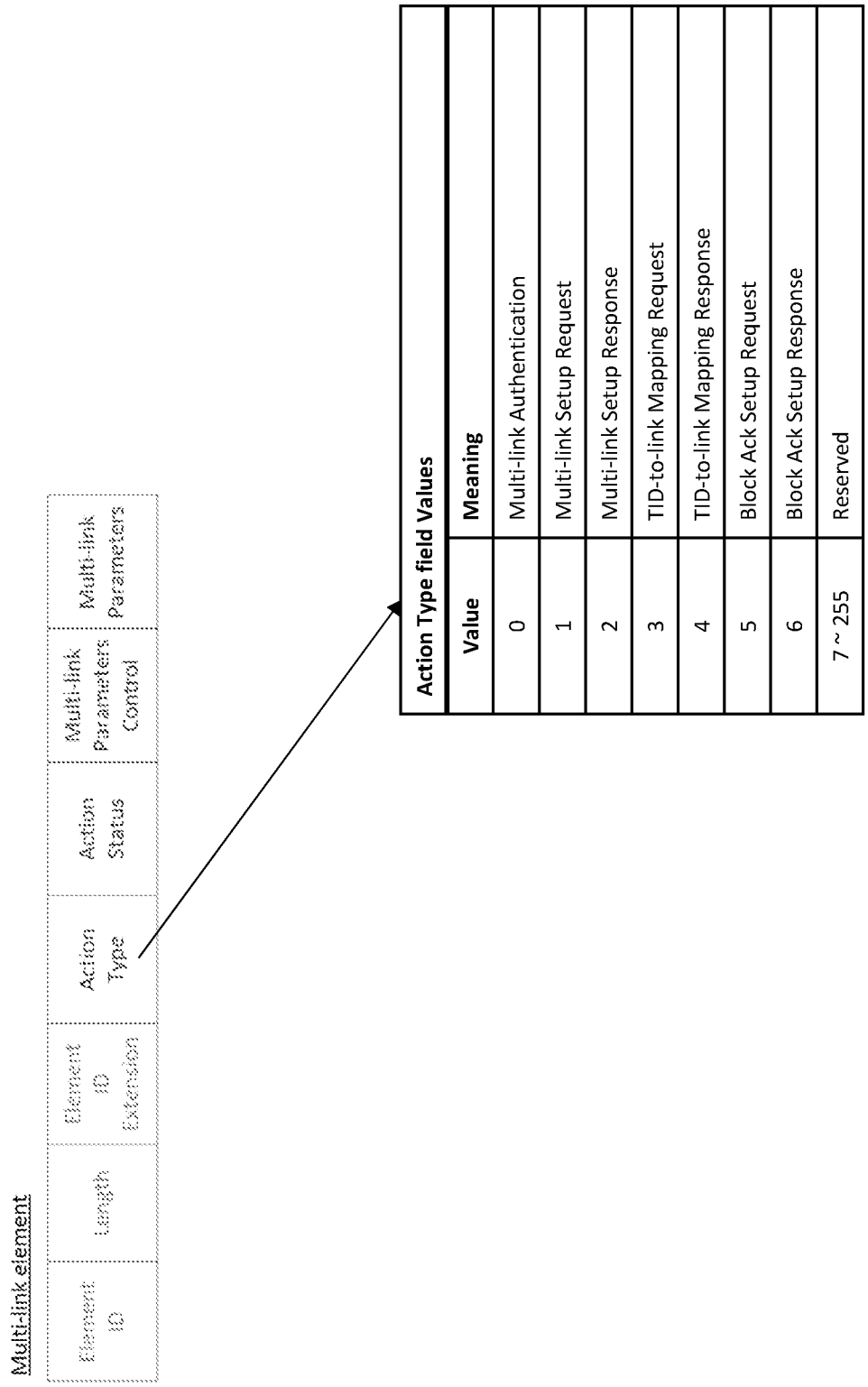
FIG. 8 depicts an illustration of a multi-link element in accordance with a first embodiment.

FIG. 8 depicts an illustration of a multi-link element 800 in accordance with the first embodiment. The multi-link element 800 may comprise an element ID field, a length field, an element ID extension field, an action type field, an action status field, a multi-link parameters control field and a multi-link parameters field. The multi-link element 800 may be carried in the multi-link action frame 600 or other frames such as association request/response frames and other management frames. Multiple multi-link elements may also be carried in the same frame if multiple multi-link operations are signaled in the same frame exchange e.g. TID Mapping and BA Setup, or Multi-link Setup and TID Mapping. The operations are signaled by the value indicated in the action type field of the multi-link element 800. A value of 0 may indicate a multi-link authentication, a value of 1 may indicate a multi-link setup request, a value of 2 may indicate a multi-link setup response, a value of 3 may indicate a TID-to-link mapping request, a value of 4 may indicate a TID-to-link mapping response, a value of 5 may indicate a block ack setup request, and a value of 6 may indicate a block ack setup response. Other values 7-255 may be reserved.

Figure 9:
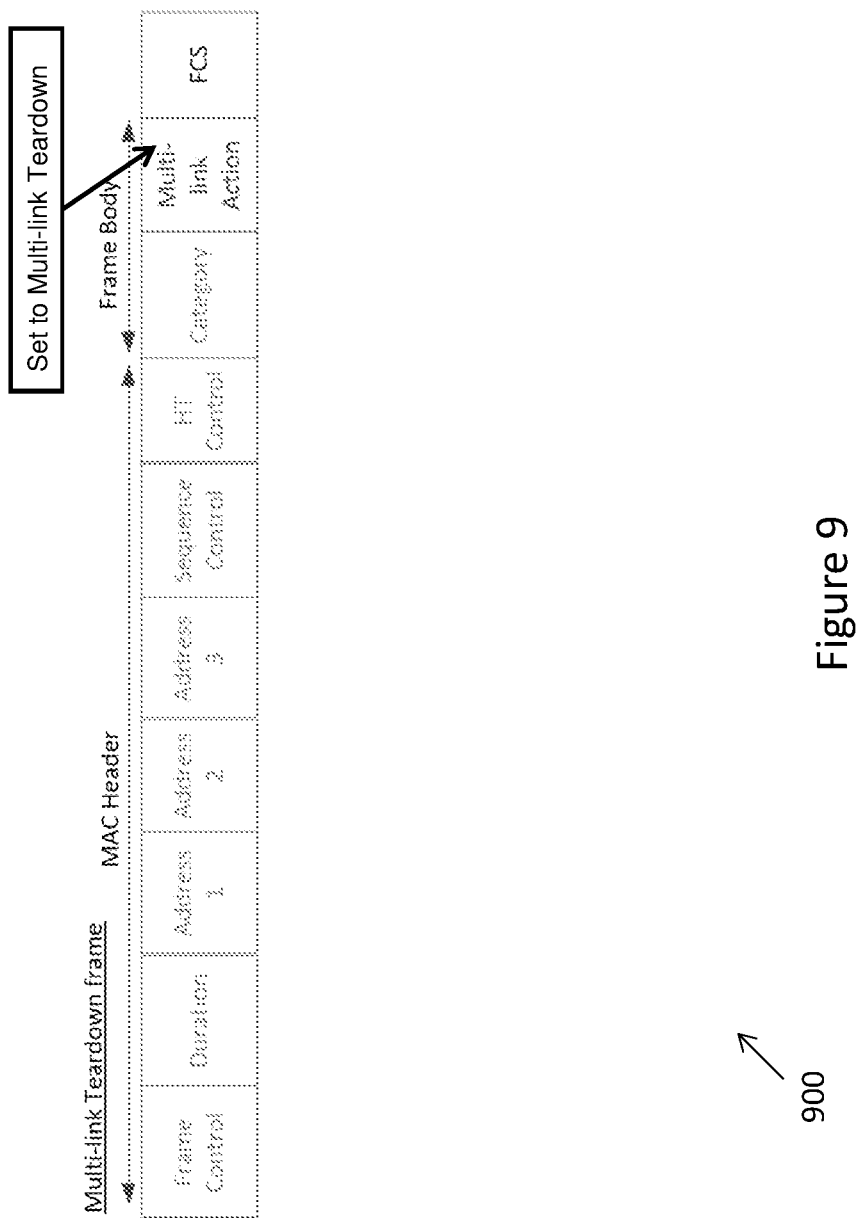
FIG. 9 depicts an illustration of a multi-link teardown frame in accordance with a first embodiment.

FIG. 9 depicts an illustration of a multi-link teardown frame 900 in accordance with the first embodiment. The multi-link teardown frame 900 may comprise a frame control field, a duration field, three address fields, a sequence control field, a HT control field, a category field, a multi-link action field which is set to a value of 1 (i.e. set to multi-link teardown) and an FCS field.

Alternatively, different multi-link action frames and different multi-link elements may be defined for each category. Additionally, a different signaling may be defined for the purpose of adding/removing links (i.e. Multi-link Link Add_Remove Request/Response).

Figure 10:
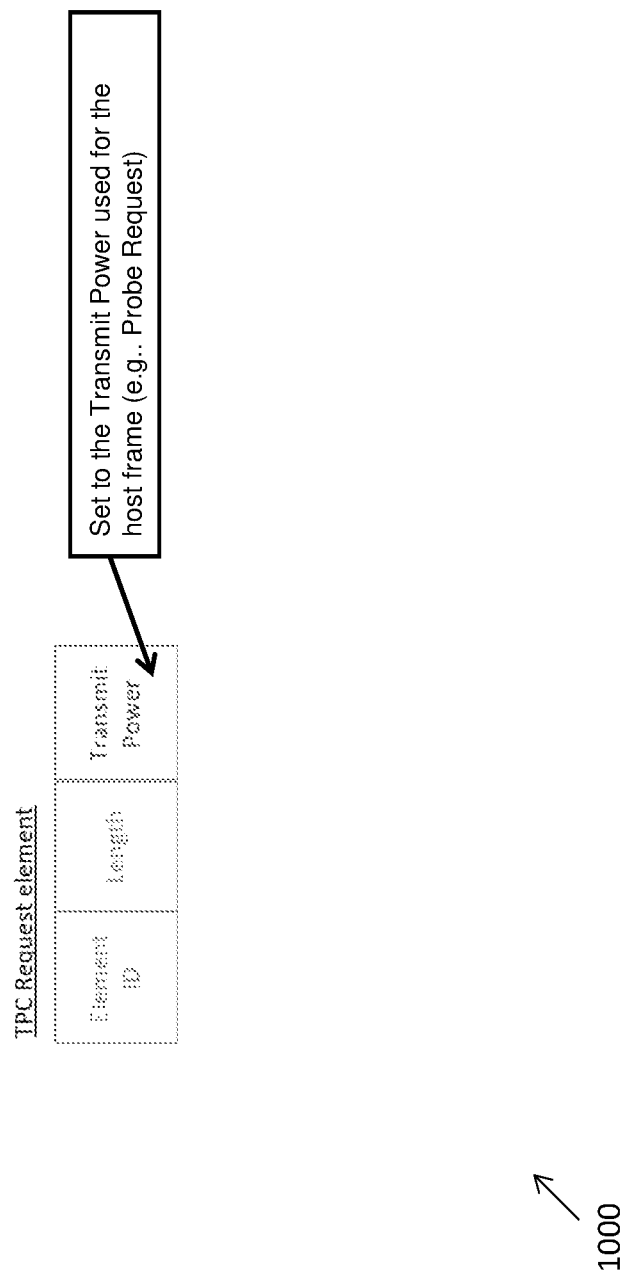
FIG. 10 depicts an illustration of a transmit power control (TPC) request element in accordance with a first embodiment.

Referring back to FIG. 5, after discovering the multi-link BSSs (i.e. through the Multi-link capabilities element in Beacon frames), to enable an AP to calculate UL Path Loss, the non-AP MLD 504 may include its transmit power (i.e. in a modified transmit power control (TPC) Request element) in probe request frames 506 transmitted in each multi-link BSS (link). FIG. 10 depicts an illustration of a TPC request element 1000 in accordance with the first embodiment. The TPC request element 1000 may comprise an element ID field, a length field and a transmit power field. The transmit power field may be set to the transmit power used for the host frame i.e. probe request frame 506.

Figure 11:
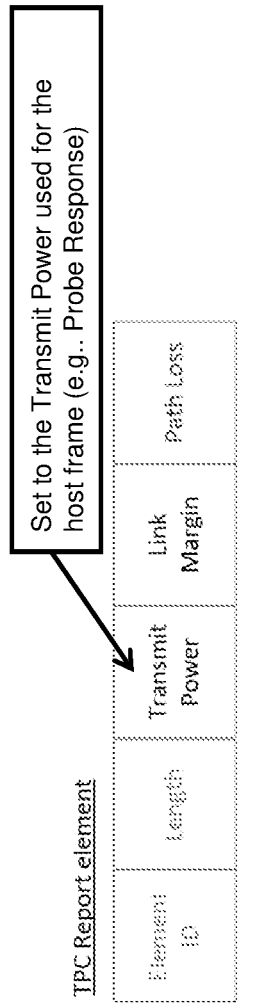
FIG. 11 depicts an illustration of a TPC report element in accordance with a first embodiment.

Based on the transmit power indicated in the TPC request element of the received probe request frame, the AP MLD 502 may estimate the UL path loss and the UL link margin and includes the information in probe response frames 508 (i.e. in a modified TPC report element) for transmission in each multi-link BSS back to the non-AP MLD 504. FIG. 11 depicts an illustration of a TPC report element 1100 in accordance with the first embodiment. The TPC report element 1000 may comprise an element ID field, a length field, a transmit power field, a link margin field and a path loss field. The transmit power field may be set to the transmit power used for the host frame i.e. probe response frame 508. Link margin is the difference between the received power (dBm) and the receiver sensitivity (dBm). The link margin field is coded as a 2s complement signed integer in units of decibels, and may be set to —128 to indicate that no link margin is provided. Path Loss is the difference between the transmit Power and received power of the frame carrying the TPC Request element e.g. a Probe Request frame received from a non-AP MLD. The path loss field is coded as a 2s complement signed integer in units of decibels, and may be set to 128 to indicate that no path loss is provided. The link margin field is set to the UL link margin estimated by the AP MLD 502, and the path loss field is set to the UL path loss estimated by the AP MLD 502.

Upon receiving the probe response frames 508, the non-AP MLD 504 can use the transmit power information in the TPC report element to calculate the DL Path Loss while DL Link margin can be calculated based on the received power. The non-AP MLD 504 can use the information of the Link Margin and Path Loss to estimate the UL/DL Link Quality of each BSS (Link). Alternatively, Link Measurement Request/Report frames may be used to achieve similar information if they are re-classified as Class 1 frames for non-directional multi-gigabit (DMG)/11 be STAs. In addition, the AP MLD 502 may also advertise its MLD MAC Address in Beacon/Probe Response frames (e.g. within the Multi-link capabilities element) for use during Multi-link Authentication (SAE, FILS), Multi-link Setup. If not, Probe Request frame need to carry an indication for a request of the AP MLD's MAC address. It will be appreciated that Link Measurement Request/response frames are mentioned as alternatives here, but any other suitable management frames may be used for the purpose. Further, the results of sounding procedure (e.g. Channel Quality Index (CQI)) may also be used if available.

Authentication, if successful, changes legacy STAs state to a state 2. For MLDs, the states may be maintained at MLD level (instead of STA level). For Open Systems Authentication (e.g. EAP), two Authentication frames are exchanged between two MLDs. Existing authentication steps may be reused, or it may be omitted entirely. For SAE (i.e. authentication using password), four authentication frames are exchanged between two MLDs that use a shared key (e.g. a password) to authenticate each other and to generate the pairwise master key (PMK). The MLD MAC addresses may be used instead of the link MAC addresses to initialize the STA-A-MAC and STA-B-MAC values used to generate the secret password element (PWE). For FILS authentication, two Authentication frames are exchanged between two MLDs to authenticate each other and to generate the PMK. AP-BSSID/STA-MAC may be replaced with corresponding MLD MAC address to generate the PMK.

Figure 12:
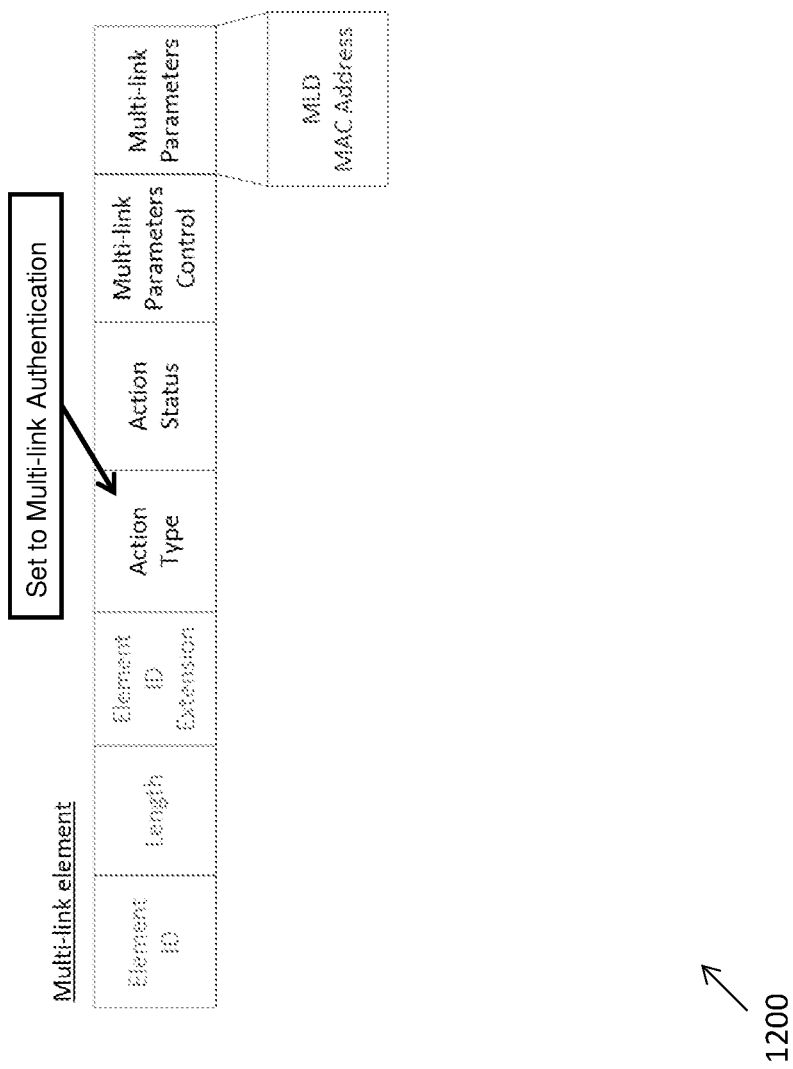
FIG. 12 depicts an illustration of a multi-link element configured for multi-link authentication in accordance with a first embodiment.

Referring to FIG. 5, it is assumed that the non-AP MLD 504 discovers the AP-MLD's MLD MAC address during multi-link discovery, but the non-AP MLD 504 needs to include its MLD MAC address in the Authentication/Multi-link Setup frame (e.g. in the Multi-link element) in order to allow the AP MLD 502 to authenticate the non-AP MLD 504 and also to signal to the AP MLD 502 to use the MLD MAC addresses for SAE and FILS authentication. A multi-link element may be carried in an Authentication frame (or Multi-link Setup frame) for this purpose. FIG. 12 depicts an illustration of a multi-link element 1200 configured for multi-link authentication in accordance with the first embodiment. The multi-link element 1200 comprises the same fields as the multi-link element 800. However, the action type field is set to a value of 0 indicating multi-link authentication, and the multi-link parameters field is set to the MLD MAC address of the non-AP MLD 504. It will be appreciated that Multi-link Setup Request/Response frames may be used, or Authentication frames may be reused. Multi-link Authentication is used to establish the identity of one MLD as a member of the set of MLDs authorized to associate with another MLD.

Figure 13:
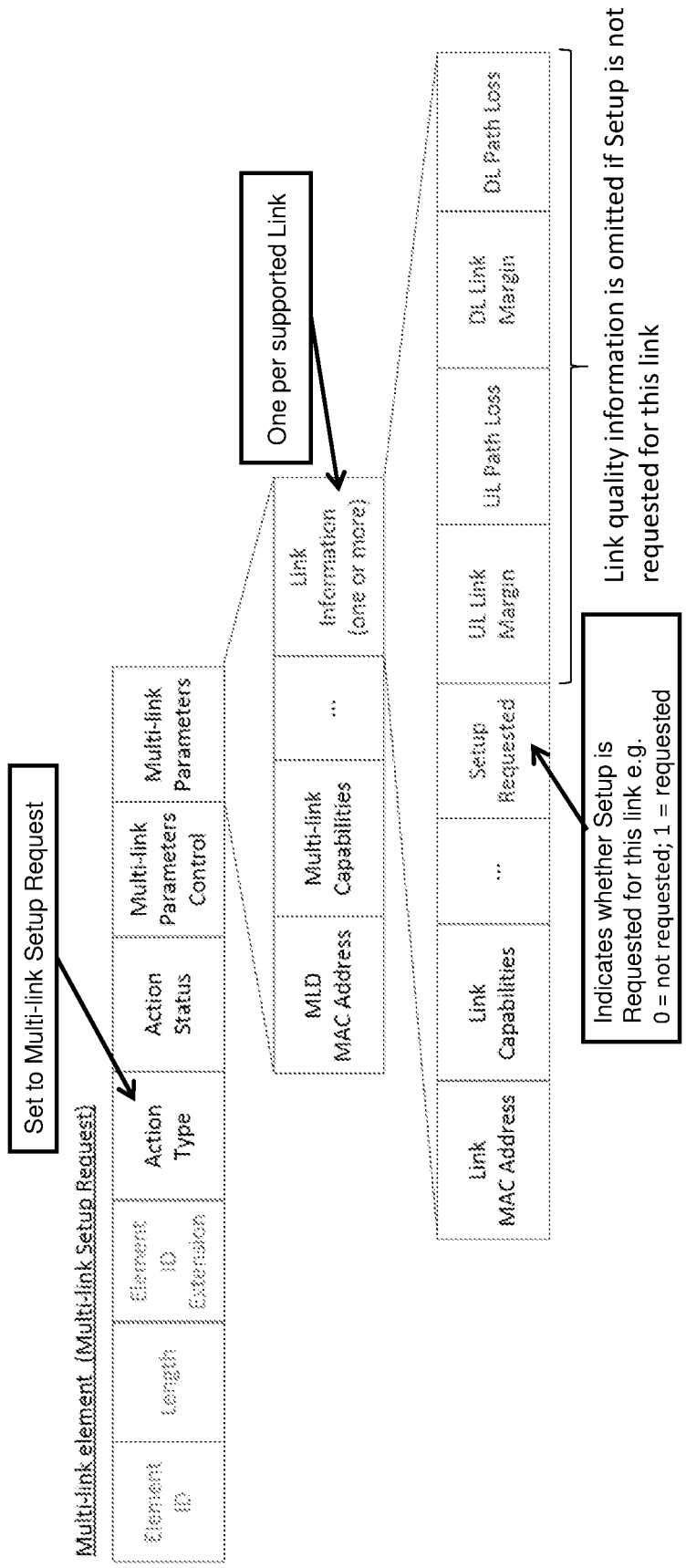
FIG. 13 depicts an illustration of a multi-link element configured for multi-link setup request in accordance with a first embodiment.

FIG. 13 depicts an illustration of a multi-link element 1300 configured for multi-link setup request in accordance with the first embodiment. The action type field is set to multi-link setup request (i.e. to a value of 1). The multi-link parameters field may further comprise an MLD MAC address field, a multi-link capabilities field, a common info field carrying information common to all links and one or more link information fields (i.e. one link information field for each supported link). Each link information field may comprise information specific to a link, e.g. a link MAC address subfield, a link capabilities subfield, a setup requested subfield, a UL link margin subfield, UL path loss subfield, DL link margin subfield and DL path loss subfield.

Referring to the multi-link setup in FIG. 5, the non-AP MLD 504 can explicitly request which links to be established i.e. by using the setup requested subfield in the multi-link element 1300. For example, a value of 0 indicates that setup is not requested for the concerned link, while a value of 1 indicates that setup is requested. The non-AP MLD 504 may consider the information of link quality to make the decision of which links to request for Multi-link setup. It may also consider other factors, for example, non-AP MLD 504 may have capabilities for the 2.4 GHz link (i.e. link 1) but may choose not to request setup of the link due to coexistence issues with its Bluetooth radio, or it may choose not to request setup of certain links to save power etc. The non-AP MLD 504 may also include information about the link quality (e.g. UL/DL link margin, UL/DL Path Loss etc. obtained during Discovery) of the requested links. If link quality information is not available, receive signal strength indicator (RSSI)/received channel power indicator (RCPI) of Beacon/Probe Response frames received on the link may be included as an estimate of the link quality. The results of sounding procedure (e.g. Channel Quality Index (CQI)) may also be used if available as link quality information.

The non-AP MLD 504 may also include fields that describe the characteristics and QoS expectations of a traffic flow in the concerned link. Further, link quality information in UL link margin subfield, UL path loss subfield, DL link margin subfield and DL path loss subfield may be omitted if setup is not request for the concerned link. Advantageously, this ensures that links are setup based on non-AP MLD's requests and link quality.

Upon receiving the multi-link setup request from the non-AP MLD 504, the AP MLD 502 will only set up the links requested by the non-AP MLD 504 (i.e. assignment of AIDs, inclusion in the Association Record etc.), and subsequent procedures (i.e. TID-to-link mapping, Security Key generations/distributions etc.). The AP MLD 502 may use the information about the link quality to decide whether or not to setup/enable a requested link, especially if there is TID restriction on some links. The information may also be used for subsequent TID-to-link mapping (i.e. link enabling/disabling). The AP MLD 502 may maintain a table of minimum link quality required to allow a non-AP MLD to use a link.

Figures 14A, 14B:
FIG. 14A depicts a variation of a minimum link quality requirement table maintained by an AP MLD in accordance with a first embodiment.
FIG. 14B depicts a User Priority (UP) to TID mapping table specified in the 802.11 specification.

FIG. 14A depicts a variation of a minimum link quality requirement table maintained by an AP MLD in accordance with the first embodiment. FIG. 14A specifies the link quality (in terms of Link Margin) required to map TIDs to a particular link. Different links may have different values. For example, referring to FIG. 14A, a link with TID 6, 7 (AC_VO) mapped to it may have a higher requirement of link quality to support higher MCS. The requirement may be different for Uplink (UL) and Downlink (DL). FIG. 14B depicts the User Priority (UP) to TID mapping specified in the 802.11 specification.

If provided, an AP MLD may also use information of traffic flow (similar to TSPEC element) to decide whether to setup/enable a particular requested link for a non-AP MLD. For example, the AP MLD may refuse to enable a link with TIDs 6, 7 mapped to it for a non-AP MLD that has indicated heavy traffic flow for TIDs 6, 7 in order to maintain the QoS requirements on the link. In some cases, an AP MLD may setup all requested links and only consider the link quality to decide whether or not to enable a link (e.g. during initial or subsequent TID-to-link mappings). In other cases, the AP MLD may consider the link quality even to setup a requested link.

Figure 14C:
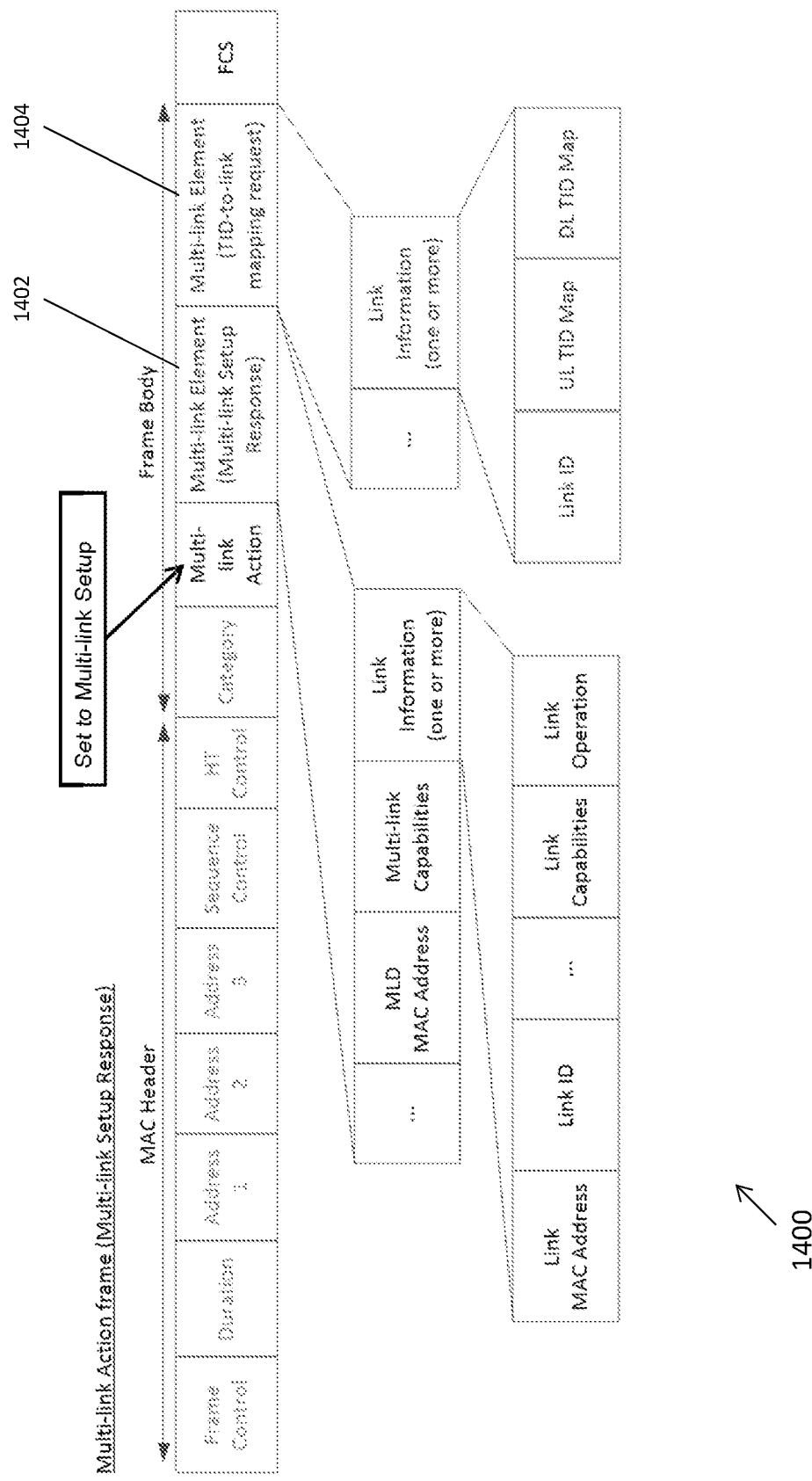
FIG. 14C depicts an illustration of a multi-link element configured for multi-link setup response and TID-to-link mapping in accordance with a first embodiment.

An AP MLD may only include the information of the links that have been setup in a multi-link setup response frame. FIG. 14C depicts an illustration of a multi-link action frame 1400 configured for multi-link setup response and TID-to-link mapping in accordance with the first embodiment. The multi-link action field of the multi-link action frame 1400 is set to multi-link setup (i.e. to a value of 0). The multi-link action frame 1400 further comprises two multi-link elements 1402 and 1404. Multi-link element 1402 is similar to multi-link element 1300 i.e. action type field set to multi-link setup request with one or more link information subfields (one for each link that have been set up). The action type field of multi-link element 1404 is set to TID-to-link mapping request (i.e. set to a value of 3) and may comprise (similar to multi-link elements 1300 and 1402) one or more link information fields (one for each link that have been setup). However, each of the one or more link information field may comprise a link ID subfield, a UL TID map and a DL TID map. Each TID Map may be a bitmap (i.e. 8 bits: 1 bit/TID) indicating the TIDs mapped to the link for that direction (UL or DL), or one or more 4-bits field may be used to indicate the TIDs. An example of a TID map encoding based on 4-bits field is illustrated in FIG. 14D, having values ranging from 0 to 15. A non-AP MLD, upon receipt of the TID-to-link mapping request frame from the AP MLD, may transmit back a TID-to-link mapping response frame indicating acceptance of the TID mapping. If a TID mapping is refused, default TID Mapping applies to the link or the AP MLD may disable the link for the non-AP MLD. It will be appreciated that two Multi-link Elements may be carried in a Multi-link Setup Action frame (or an Association Response frame) to signal the Multi-link setup and TID-to-link mapping respectively, or they may also be combined in a single element.

Furthermore, not only multi-link Setup request/response frames may be used for multi-link setup, association request/response frames (i.e. carrying Multi-link elements) may also be used for multi-link setup. Upon successful completion of the Multi-link setup, one or more non-AP STAs of a non-AP MLD is able/allowed to invoke the distribution system services via one or more AP STAs of an AP MLD.

New MAC sublayer management entity (MLME) primitives may be defined for multi-link setup e.g. for use by a non-AP MLD or an AP MLD. MLME primitives are used to pass information between the MLME and the station management entity (SME). The SME uses the services provided by the MLME through the MLME SAP. The primitive to request multi-link setup for a non-AP MLD may be as follows:

---
MLME-MULTI-LINK-SETUP.request(
 ...,
 PeerMLDAddress,
 PeerLinkAddress,
 Dialog Token,
 Multi-link element
)

---

This primitive causes a Multi-link Setup Request frame to be transmitted to a peer MLD. PeerMLDAddress is set as the peer MLD's MLD MAC address; PeerLinkAddress is set as the MAC Address of the affiliated STA of the peer MLD (of the link in which the Multi-link Setup request frame is to be transmitted). One or more Multi-link elements may be included to carry the information required for the Multi-link Setup Request.

The primitive to confirm a multi-link setup for a non-AP MLD may be as follows:

---
MLME-MULTI-LINK-SETUP.confirm(
 ...,
 PeerMLDAddress,
 Dialog Token,
 Multi-link element
)

---

This primitive is generated upon receipt of a Multi-link Setup Response frame. PeerMLDAddress is set as the peer MLD's MLD MAC address; one or more Multi-link elements carried in the Multi-link Setup Response frame are included. Dialog Token is used to identify the Multi-link Setup request/response transaction.

The non-AP MLD indicates that one or more links are available by invoking the MLME-MULTI-LINK-SETUP.confirm primitive. This signals the Supplicant that the MLD MAC has transitioned to state 3. If an MLD negotiates to use IEEE 802.1X authentication during Multi-link Setup, the MLD's management entity may respond to the MLME-MULTI-LINK-SETUP.confirm (or indication) primitive by requesting the Supplicant (or Authenticator) to initiate IEEE 802.1X authentication. Thus, in this case, authentication is driven by the non-AP MLD's decision to initiate a Multi-link Setup and the AP MLD's decision to accept the Multi-link Setup.

The primitive to indicate the receipt of a request for multi-link setup for an AP MLD may be as follows:

```
MLME-MULTI-LINK-SETUP.indication(
    ...,
    PeerMLDAddress,
    Dialog Token,
    Multi-link element
)
```

This primitive may be generated upon receipt of a Multi-link Setup Request frame. PeerMLDAddress is set as the peer MLD's MLD MAC address. One or more Multi-link elements carried in the Multi-link Setup Request frame are included.

The primitive to respond to a request for multi-link setup for an AP MLD may be as follows:

```
MLME-MULTI-LINK-SETUP.response(
    ...,
    PeerMLDAddress,
    PeerLinkAddress,
    Dialog Token,
    Multi-link element
)
```

This primitive causes a Multi-link Setup Response frame to be transmitted to a peer MLD. PeerMLDAddress is set as the non-AP MLD's MLD MAC address; PeerLinkAddress is set as the MAC Address of the affiliated STA of the peer MLD (of the link in which the Multi-link Setup response frame is to be transmitted). One or more Multi-link elements may be included to carry the information required for the Multi-link Setup Response.

Further, the primitive to request for a multi-link teardown (for both non-AP MLD or AP MLD) may be as follows:

```
MLME-MULTI-LINK-TEARDOWN.request(
    ...,
    PeerMLDAddress,
    Link IDs
)
```

This primitive causes a Multi-link Teardown frame to be transmitted. PeerMLDAddress is set as the peer MLD's MLD MAC address. Optionally, one or more Link IDs may be included, each Link ID identifying a link to be torn down.

Figure 15:
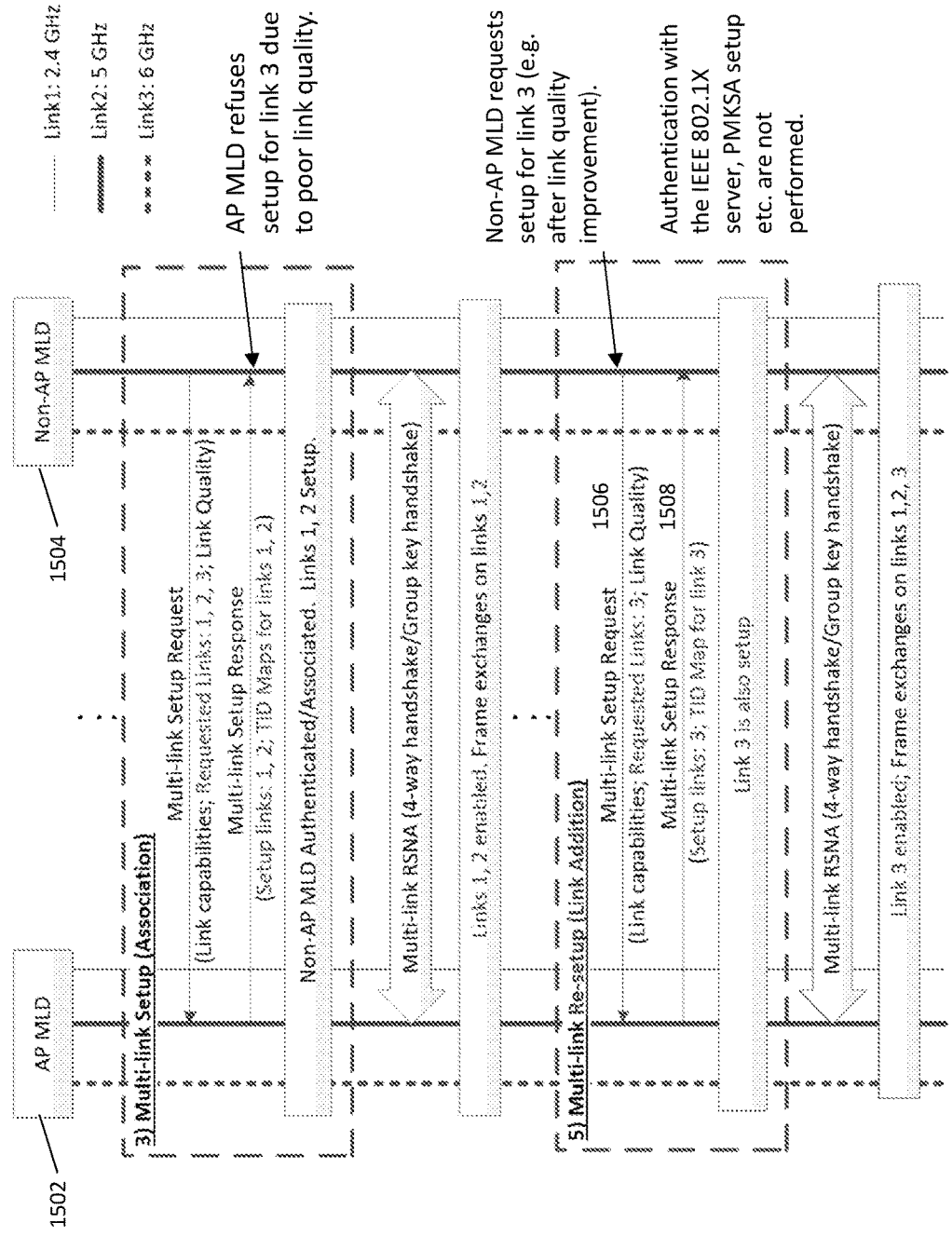
FIG. 15 depicts communication flow between an AP MLD and a non-AP MLD including a multi-link re-setup request in accordance with a first embodiment.

A non-AP MLD may request to add a new link by reperforming the Multi-link Setup. Link quality, traffic flow information may also be included. FIG. 15 depicts an illustration 1500 of communication flow between an AP MLD 1502 and a non-AP MLD 1504 including a multi-link re-setup request in accordance with the first embodiment. During multi-link setup, the AP MLD 1502 refuses setup for link 3 due to poor link quality. Therefore, only links 1 and 2 are enabled. Subsequently, the non-AP MLD 1504 may request setup for link 3, for example due to an improvement in link quality of link 3, by transmitting a multi-link setup request 1506 comprising request information to AP MLD 1502. The request information may comprise link capabilities, information identifying link 3 and link quality of link 3.

The AP MLD 1502 sets up, based on the request information, the requested link and transmits a multi-link setup response 1508 to the non-AP MLD 1504 comprising information of the setup link (i.e. link 3) and TID map for link 3. Authentication with the IEEE 802.1X server, PMKSA setup etc. are not performed. Advantageously, this enables flexibility in adding new links with improved link quality.

Since the non-AP MLD 1504 is already considered authenticated/associated with the AP MLD 1502 during the initial Multi-link Setup, the AP MLD 1504 only performs procedure related to addition of the new requested link (e.g. AID assignment for the new link, Update of link MAC address to the Association record, TID-to-link mapping etc.). Security keys (i.e. Pairwise Temporal Key (PTK), Group Temporal Key/(Integrity) Group Temporal Key (GTK/IGTK)) may also be generated/distributed for the new link if needed. If the same PTK is used for all enabled links, 4-way handshake is not necessary for the new link. If different GTK/IGTK are used for the new link, they can be distributed using the Group Key handshake. Alternatively, instead of reusing Multi-link Setup, a different signaling may be defined for this purpose (e.g. Multi-link Link Addition Request/Response).

Addition of a new link may necessitate changes to some parameters of existing block ack agreement for TIDs mapped to the new link. For existing block ack agreements with the AP MLD as the originator (i.e. for DL flow), the AP MLD may also include the related block ack parameters in the same frame carrying the Multi-link Setup Response. Non-AP MLD may also follow this by initiating an update of block ack parameters for the TIDs mapped to the new link for the UL flow (either in an add block acknowledgement (ADDBA) Request frame or piggy backed in another frame e.g. in a TID-to-link mapping Response frame).

Figure 16:
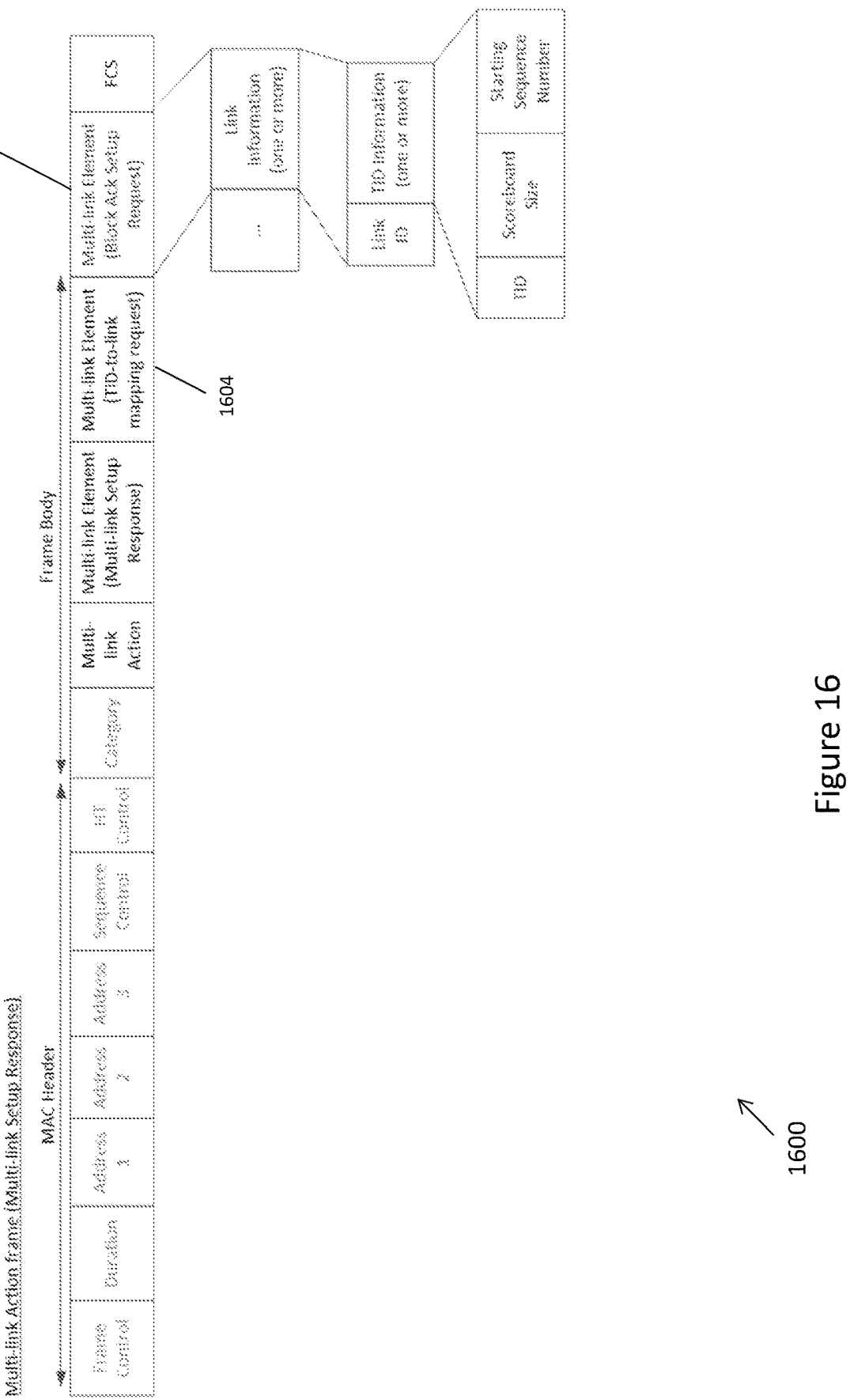
FIG. 16 depicts an illustration of a multi-link action frame configured for multi-link setup response in accordance with a first embodiment.

FIG. 16 depicts an illustration of a multi-link action frame 1600 configured for multi-link setup response for addition of new link in accordance with the first embodiment. While similar to the multi-link action frame 1400, the multi-link action frame 1600 further comprises a multi-link element (block ack setup request) field 1602. The multi-link element 1602 may comprise one or more link information fields, each of the one or more link information fields comprising a link ID field and one or more TID information field. Further, the one or more TID information field may comprise a TID subfield, a scoreboard size subfield and a starting sequence number subfield. Related block ack parameters for the new link may thus be included in the multi-link element 1602.

In response to the TID-to-link mapping request 1604, the non-AP MLD receiving the multi-link action frame 1600 may transmit a TID-to-link mapping Response frame back to the transmitting AP MLD. The TID-to-link mapping Response frame may be a Multi-link Action frame carrying a Multi-link element with the Action Type set to TID-to-link Mapping Response.

The dynamic enablement/disablement of links (using TID-to-link mapping) may affect the block ack parameters (e.g. Receive Reordering Buffer size, unified BA scoreboard size etc.) and may trigger ADDBA re-negotiation during each link enablement/disablement. For example, if a new link is added, the BA Scoreboard size, starting sequence number etc. need to be specified for the new link. The Recipient MLD may also be required to increase the receiving (RX) Reordering buffer size to be able to receive the additional frames from the added link.

Figure 17:
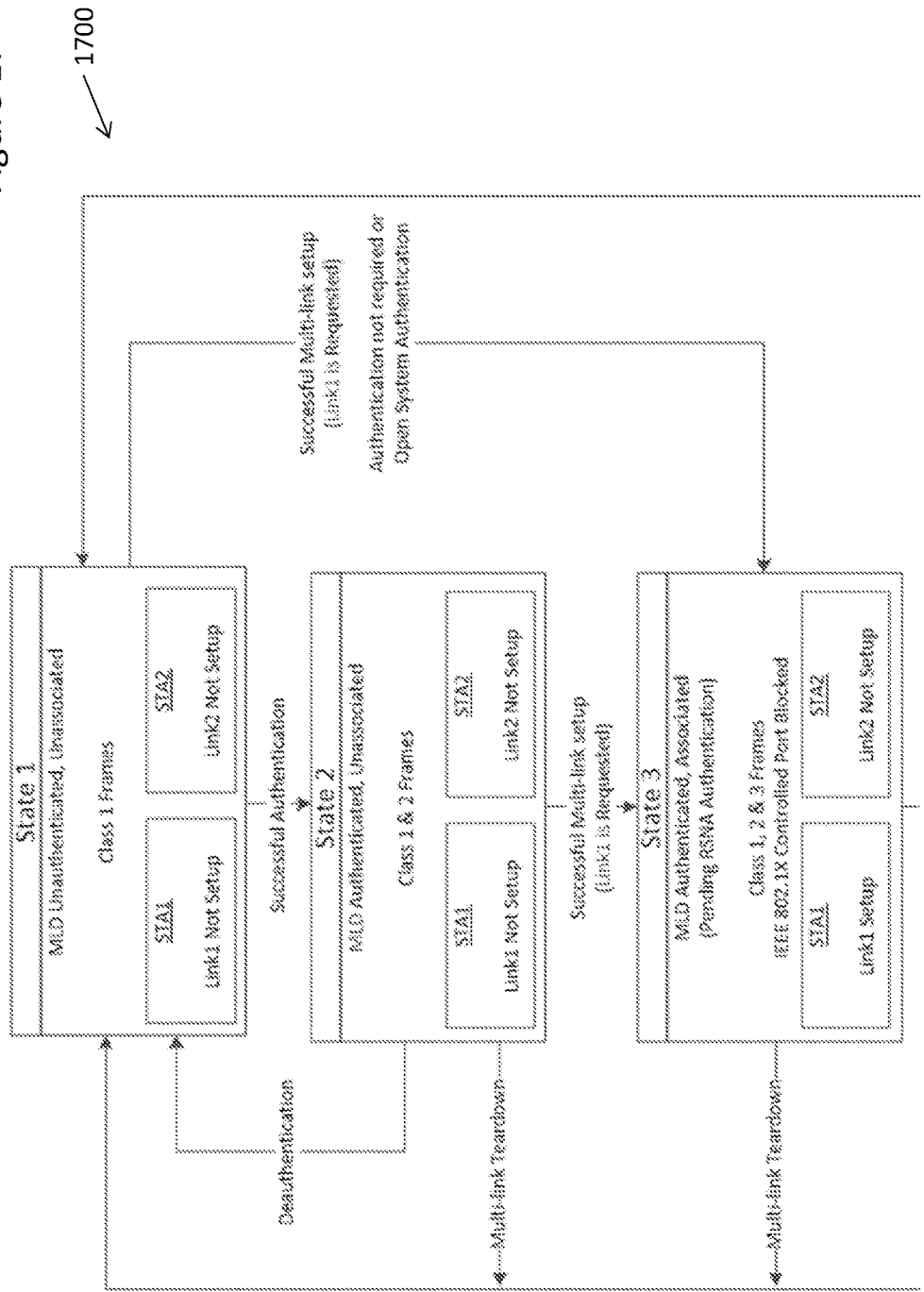
FIG. 17 depicts a state transition diagram in accordance with a first embodiment.

FIG. 17 depicts a state transition diagram 1700 in accordance with the first embodiment. An MLD may keep an enumerated state variable for each MLD with which direct communication via the WM is needed through one or more links (instead of maintaining state between two affiliated STAs). For example, based on the state transition diagram 1700, each MLD may be in one of four states: State 1 (unauthenticated, unassociated), State 2 (authenticated, unassociated), State 3 (authenticated, associated, pending RSNA authentication) and State 4 (authenticated, associated, RSNA established or not required). A successful authentication changes the MLD's state from State 1 to State 2. A successful Multi-link Setup (with at least one link requested) will change the MLD's state from state 2 to state 3. Confirmation of security parameters takes place during Multi-link setup. An MLD performing IEEE 802.1X authentication uses Open System authentication. An MLD performing password-based authentication can use SAE authentication. An MLD performing FILS uses FILS authentication. SAE authentication and FILS authentication provides mutual authentication and derivation of a PMK. If Open System authentication is chosen instead, the Authenticator or the Supplicant initiates IEEE 802.1X authentication. Prior to the completion of IEEE 802.1X authentication and the installation of keys, the IEEE 802.1X Controlled Port in the AP MLD blocks all Data frames. The IEEE 802.1X Uncontrolled Port allows IEEE 802.1X frames to pass between the Supplicant and Authenticator. The authentication process, whether SAE authentication or FILS authentication utilizing Authentication frames or IEEE 802.1X authentication utilizing Data frames post association, creates cryptographic keys shared between the cryptographic endpoints—the AP MLD and the non-AP MLD, or the IEEE 802.1X AS (Authentication server) and the non-AP MLD, when using SAE/FILS or IEEE Std 802.1X, respectively. When using IEEE Std 802.1X, the AS transfers these keys to the AP MLD, and the AP MLD and the non-AP MLD uses one of the key confirmation handshakes, e.g., the 4-way handshake or FT 4-way handshake over any one of the links, to complete security association establishment. When using SAE authentication there is no AS and therefore no key transfer; the 4-way handshake is performed directly between the AP MLD and the non-AP MLD. The key confirmation handshake indicates when the links have been secured by the keys and is ready to allow normal data traffic and protected robust Management frames. When FILS authentication is performed, the key confirmation is performed as part of the FILS exchange using association frames. Hence, no additional handshake is necessary. As long as the key confirmation handshake is completed for at least one link, the IEEE 802.1X Controlled port is considered unblocked for the non-AP MLD. The IEEE 802.1X Controlled Port returns to the unauthorized state and blocks all Data frames following a Multi-link Teardown.

Further, a link-state is also maintained for each (pair of affiliate STA)/link, and may be one of the following four states:

Not Set up (Unestablished/Unavailable): AP MLD and non-AP MLD do not have all the information to enable data operation with each other. Allowed frames depend on the MLD State. Data frames are not allowed. Access to DS is dis-allowed.

Setup (or established): AP MLD and non-AP MLD have all the information to enable data operation with each other. Data frames (except EAPOL frames) are not allowed. Access to DS is dis-allowed.

Enabled (Activated): Both MLDs agree to start data operation on the link. E.g. at least one TID is mapped to the link, Security Association (RSNA) has been completed for the link. All frames allowed by TID mapping are allowed. Access to DS is allowed.

Disabled (Deactivated): Data frames (except EAPOL frames) are not allowed. Non-Data frames may be allowed. Access to DS is disallowed.

For legacy STAs or non-MLD STAs, regular authentication/association process may be used and the states are maintained at STA level. Multi-link setup between a pair of MLDs creates a unique pair of IEEE 802.1X ports, and authentication takes place relative to those ports alone. Essentially, for MLDs, the roles of Authenticator and Supplicant may be implemented at the MLD level instead of at the STA levels.

When a STA/link is in the Not Setup state, non-EOPAL Data frames are disallowed for the link even if the IEEE 802.1X controlled port is unblocked at the MLD level. A successful Multi-link Setup (with the link requested) will change the link's state from Not Setup to Setup. A successful 4 way/group key handshake+TID-to-link mapping (with at least 1 TID mapped to the link) will change the link's state from Setup to Enabled. Successful TID-to-link mapping toggles the states between Enabled and Disabled. Multi-link teardown brings the MLD state to State 1 and all affiliated STAs/links to Not Setup state. Further, while TIDs are not mapped to the STA/link in both setup and disabled states, Security keys may not have been generated for the STA/link in setup state. On the other hand, in disabled state, Security keys have been generated for the STA/link. However, in both states, no TIDs are mapped to the links and even if the IEEE 802.1X controlled port is unblocked, AP may not forward Data frames from the links to the DS.

Figure 18:
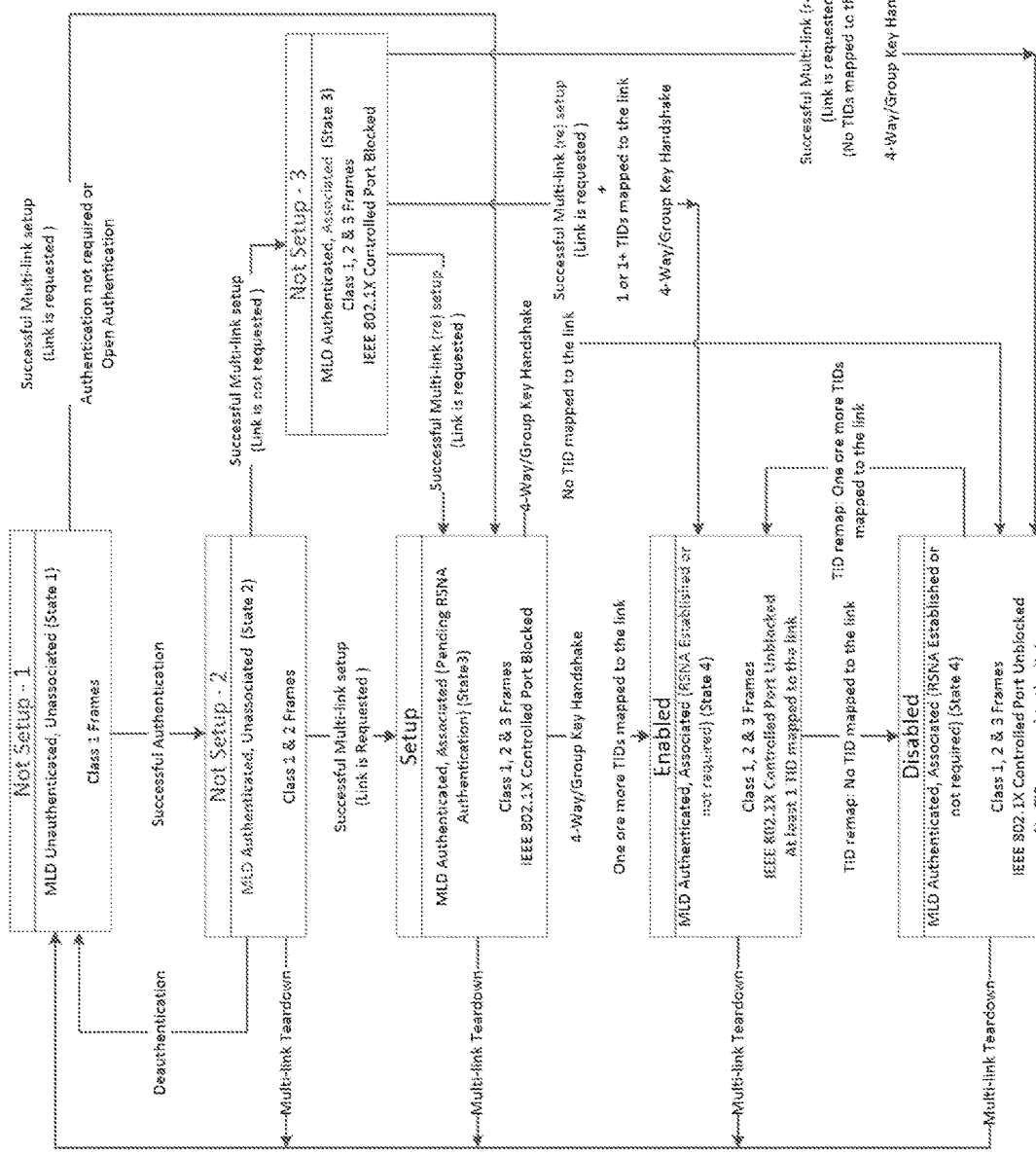
FIG. 18 depicts an alternative state transition diagram in accordance with a first embodiment.

FIG. 18 depicts an alternative state transition diagram in accordance with the first embodiment, wherein a link may be in one of four states: an Setup state (MLD authenticated, associated, pending RSNA authentication, IEEE 802.1X controlled port blocked), Enabled state (authenticated, associated, RSNA established or not required, IEEE 802.1X controlled port unblocked, at least 1 TID mapped to the link), Disabled state (MLD authenticated, associated, IEEE 802.1X controlled port unblocked, no TID mapped to the link) and Not Setup state. The Not Setup state comprises 3 sub-states depending on the MLD state: Not Setup—1 (MLD is in State 1; Only class 1 frames are allowed), Not Setup—2 (MLD is in State 2; Only class 1 & 2 frames are allowed), and Not Setup—3 (MLD is in State 3; class 1, 2, 3 frames are allowed but non-EOPAL Data frames are disallowed for the link even if the IEEE 802.1X controlled port is unblocked at the MLD level).

Figure 19:
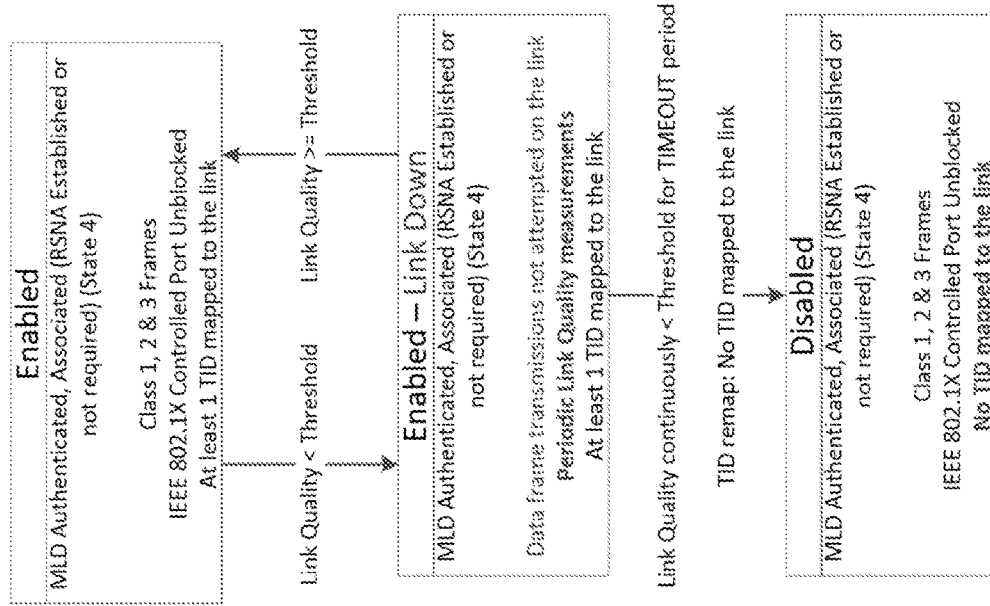
FIG. 19 depicts an illustration of how link maintenance may be carried out in accordance with a first embodiment.

In accordance with the first embodiment, MLDs may also maintain a record of the link quality of all enabled links based on Link quality measurements such as signal noise ratio (SNR), packet error ratio (PER), RSSI etc. FIG. 19 depicts an illustration of how link maintenance may be carried out in accordance with a first embodiment. For links with active transmissions, the link quality may be measured based on the transmitted/received frames. For inactive links (in awake power save state), management frames (i.e. solicited/unsolicited link measurement frames) may be transmitted periodically (i.e. once every Beacon Interval) to access the link quality. If the link quality gets below a certain threshold value, the link may be considered as "Down". Data frames may be disallowed in a "Down" link, or they may be transmitted in a lower MCS. The threshold value may depend on the TIDs mapped to the link, MCS requirement of the link etc. On the other hand, if the link quality improves above the threshold value, the link may be re-used as a normal enabled link. However, if the link quality continues to be below the threshold level for a certain TIMEOUT duration, the link may be disabled (i.e. through TID-to-link mapping). Advantageously, this ensures that links are set up based on link quality.

In accordance with a second embodiment, a non-AP MLD may implicitly signal the links to be set up during multi-link setup, by only including the information of the links (i.e. link capabilities, MAC Address etc.) that it requests for setup. Information of the links that are not requested for setup are not included in the Multi-link Setup Request. For example, the setup request may comprise information indicating capability information and MAC addresses of only the affiliated STAs of the non-AP MLD for which links are to be set up. This may be used as the default option for requesting a link to be setup. Alternatively, the link information may be provided but the request to not setup a link is signaled implicitly by setting very low link quality values (i.e. the Path Loss to a maximum value (e.g. 128) or the Link Margin to a minimum value (e.g. −128) for the concerned link for either or both UL/DL). For example, the setup request may comprise information about quality of wireless channels for a plurality of links that can be set up between the first plurality and second plurality of STAs, and wherein the quality of wireless channels are set to implicitly indicate the one or more links to be set up. Alternatively, it is possible that explicit request to setup a link is provided in the Multi-link Setup frame as described in earlier embodiment.

Figure 20:
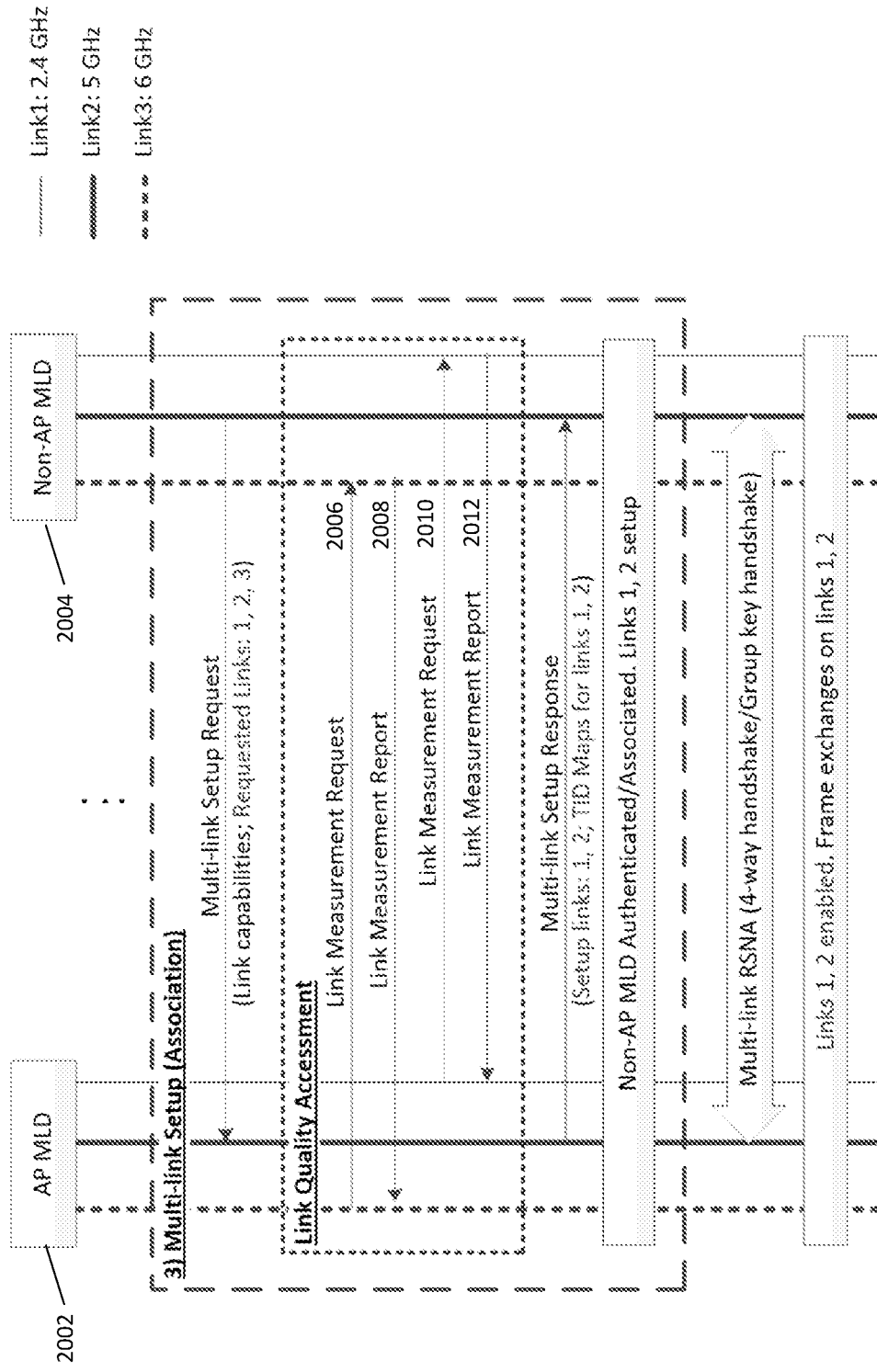
FIG. 20 depicts communication flow between an AP MLD and a non-AP MLD including a link quality assessment step in accordance with a second embodiment.

If link quality information is not included in the Multi-link setup request, before transmitting the Multi-link Setup Response, AP MLD may initiate link quality assessment of the requested links including/excluding the link on which the Multi-link request is received to decide whether or not to setup the links. FIG. 20 depicts communication flow 2000 between an AP MLD 2002 and a non-AP MLD 2004 including the link quality assessment step in accordance with the second embodiment. After the non-AP MLD 2004 initiates multi-link setup by transmitting a multi-link request on link 2 to the AP MLD to request set up of links 1, 2 and 3, the AP MLD 2002 initiates link quality assessment (prior to transmitting a multi-link setup response) by transmitting link measurement requests 2006 and 2010 on each of links 1 and 3. In this example, link quality assessment of the requested links excludes the link on which the Multi-link request is received (i.e. link 2), but AP MLD may choose to include that link as well. In response to the link measurement request, the non-AP MLD 2004 transmits link measurement report 2008 on link 1 (in response to link measurement request 2006) and link measurement report 2012 on link 3 (in response to link measurement request 2010) to the AP MLD 2002. Based on the gathered information of link qualities provided by the link measurement reports 2008 and 2012, AP MLD decides to setup/establish (at 2014) links 1 and 2 only. Link 3 is refused. Accordingly, the AP MLD 2002 transmits a multi-link setup response indicating that links 1 and 2 are set up.

The AP MLD 2002 may use the information about link quality to decide whether or not to setup/enable a requested link, especially if there is TID restriction on some links. However, any link quality assessment of the links needs to be performed such that the multi-link setup can be performed within any timeout values associated with the setup. Further, it will be appreciated that while the example as shown in FIG. 20 shows the usage of link measurement request/response frames, any other suitable management frames may also be used for the purpose.

FIG. 21 depicts an alternative state transition diagram 2100 in accordance with the second embodiment. An alternative State for MLDs is envisioned for the state transition diagram 2100 where the states are maintained at each affiliated STA level of an MLD, similar to legacy STAs. Also, the roles of Authenticator and Supplicant are implemented at the STA levels (and not at the MLD level). This version of state machine is possible for SAE and FILS authentication, i.e. IEEE 802.1X Authentication is not used. At the same time, the links maintain their own states which are the same as in the first embodiment.

For example, STA1 and STA are both in state 1 (unauthenticated, unassociated Class 1 frames, link not set up) at 2102. When a STA/link is in the Not Setup state, Data frames are disallowed for the link. A successful (multi-link) authentication brings the state of all affiliated STAs (i.e. STA1 and STA2) to State 2, at 2104. However, an excluded affiliated STA's state stays at State 1. A successful Multi-link Setup (with the link requested) will change the link's state from Not Setup to Setup, and the corresponding affiliated STA's state to state 3. Links that are not requested stays at Not Setup state and corresponding affiliated STA's state stays at state 1 or 2. For example, STA1 is in state 3 and STA2 is still in state 2 at 2106 after successful multi-link setup wherein link 1 (corresponding to STA1) is requested. A successful 4 way/group key handshake+TID-to-link mapping (with at least 1 TID mapped to the link) will change the link's state from Setup to Enabled and the corresponding affiliated STA's state to state 4. For example, at 2108 after successful 4 way/group key handshake+TID-to-link mapping (with one or more TIDs mapped to link 1) from 2106, STA1 is in state 4 and link 1 is enabled, while STA2 is still in state 2 and link 2 is still not setup. A successful multi-link resetup wherein link 2 is requested will bring STA2 to state 3 from state 2 (i.e. link 2 is set up), at 2110. Successful TID-to-link mapping toggles the link states between Enabled and Disabled but does not change the affiliated STA's state. For example, at 2114 (from 2112) after a successful TID-to-link mapping (wherein one or more TIDs are mapped to link 2 but no TID is mapped to link 1) and a successful 4-way/group key handshake for link 2, STA 1 is still in state 4 despite the link 1 being disabled and STA 2 is now in state 4 with link 2 being enabled. Alternatively, these state changes may occur from 2108 to 2114 after a successful multi-link resetup (i.e. link 2 is requested), a successful TID-to-link mapping (wherein one or more TIDs are mapped to link 2 but no TID is mapped to link 1) and a successful 4-way/group key handshake for link 2. Further, at 2116 after a successful TID-to-link mapping (wherein one or more TIDs are mapped to link 1 but no TID is mapped to link 2) from 2114, both STAs 1 and 2 will be in state 4 wherein link 1 is enabled but link 2 is disabled. It is also possible to go back to 2114 from 2116 through a successful TID-to-link mapping wherein one or more TIDs are mapped to link 2 but no TID is mapped to link 1. Further, multi-link teardown brings the state of all affiliated STAs to State 1 and all links to Not Setup state i.e. back to 2102.

In the present example, the difference between Setup and Disabled is that in both cases, no TIDs are mapped to the link. In Setup state, security keys may not have been generated for the STA/link, but in disabled state, security keys have been generated for the STA/link. However, in both states, no TIDs are mapped to the links and AP may not forward Data frames from the links to the DS.

According to the second embodiment, a non-AP MLD can request which links to be deleted as part of the multi-link Setup (i.e. explicitly by using a Deletion Requested field in the Multi-link Setup Request element, or implicitly by indicating low channel quality). The non-AP MLD may also include information about the link quality (i.e. UL/DL link margin, UL/DL Path Loss etc. obtained during Discovery) of the links requested for deletion. If link quality information is not available, RSSI/RCPI of Beacon/Probe Response frames received on the link may be included as an estimate of the link quality. The non-AP MLD may consider the information of link quality to make the decision of which links to request for deletion. It may also consider other factors; for example, the non-AP MLD may choose to request deletion of the 2.4 GHz link due to coexistence issues with its Bluetooth radio etc. or it may choose not to request deletion of certain links to save power, etc. Advantageously, this ensures that links are setup based on non-AP MLD's requests and link quality.

Figure 22:
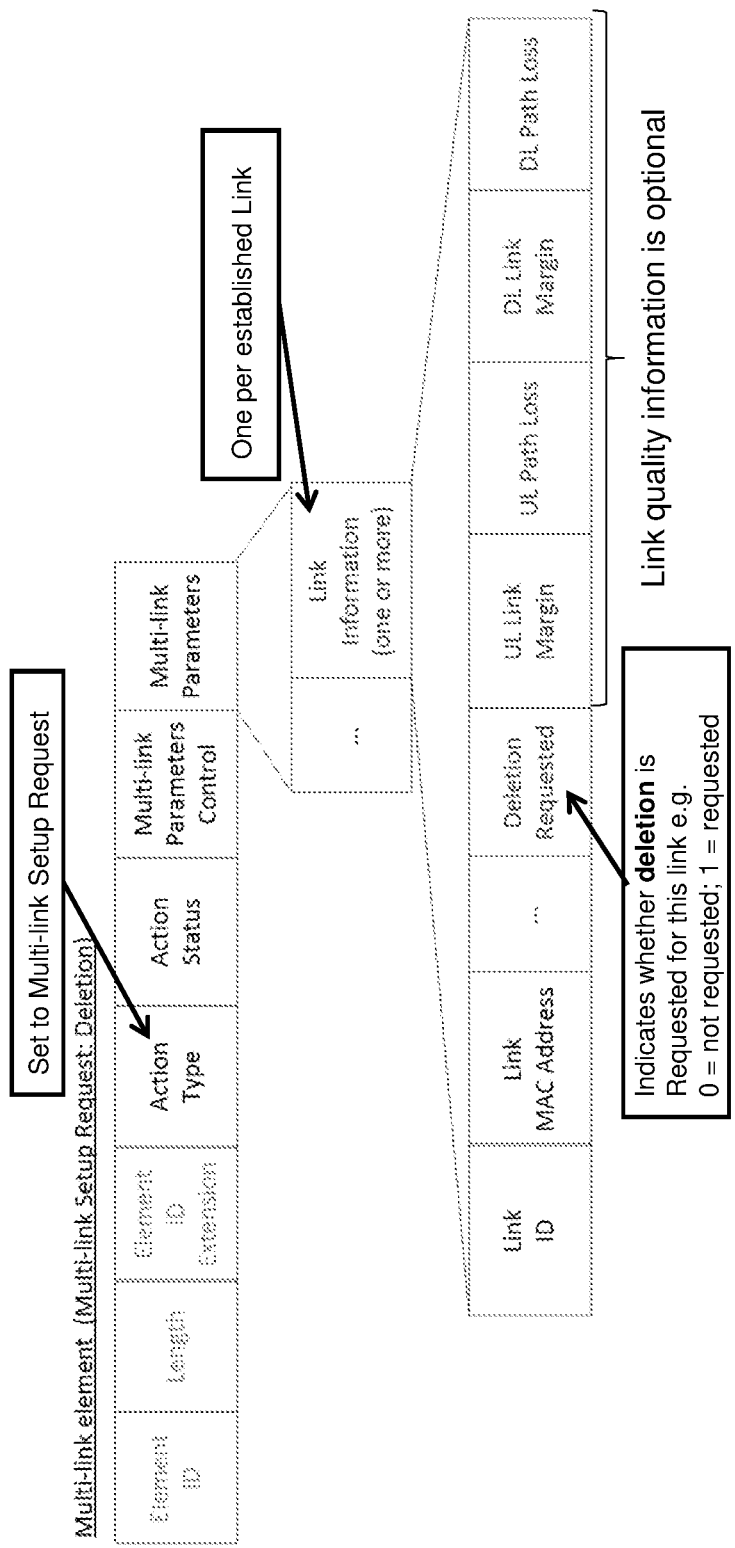
FIG. 22 depicts an illustration of a multi-link element configured for multi-link re-setup request and link deletion in accordance with a second embodiment.

FIG. 22 depicts an illustration of a multi-link element 2200 configured for multi-link re-setup request and link deletion as discussed above. The action type field of the multi-link element 2200 is set to multi-link setup request. One or more link information fields may be present such that there is one link information field per established link. Each link information field may comprise a Link ID subfield, link MAC address subfield, deletion requested subfield, UL link margin subfield, UL path loss subfield, DL link margin subfield and DL path loss subfield. The deletion requested subfield may be used to indicated whether deletion is requested for the concerned link (i.e. a value of 0=not requested, a value of 1=requested). For example, a value of 1 in the deletion requested subfield will cause the concerned link to be removed from the multi-link set. Link quality information that may be included in the UL link margin subfield, UL path loss subfield, DL link margin subfield and DL path loss subfield is optional.

Figure 23:
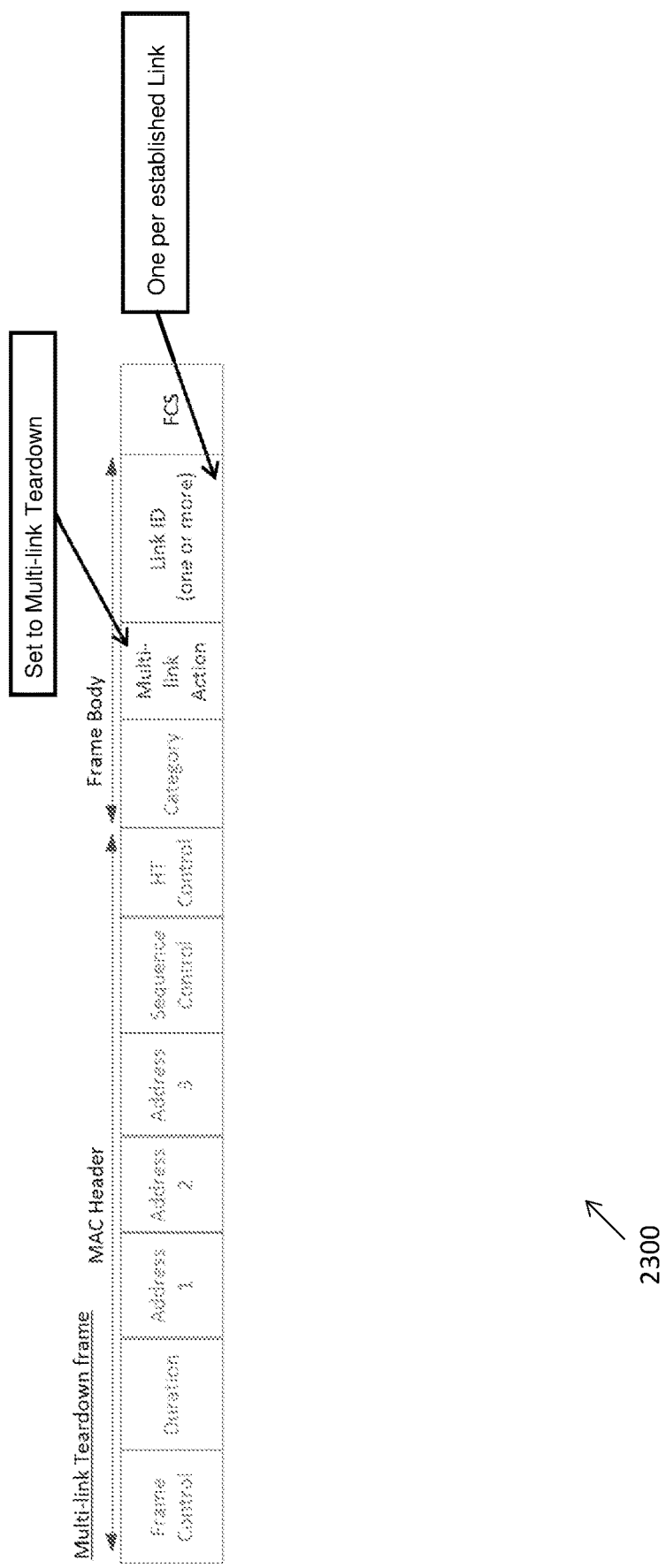
FIG. 23 depicts an illustration of a multi-link teardown frame in accordance with a second embodiment.

Alternatively, a multi-link teardown frame may also be used for link deletion. Referring to FIG. 23 illustrating a multi-link teardown frame 2300, the multi-link action field is set to multi-link teardown (i.e. to a value of 1). One or more link ID fields may be present such that there is one link ID field per established link.

Link deletion will cause the state of the link to move to Not Setup. If the connection states are maintained per affiliated STA, the states of the corresponding STAs also change to State 1 (Unauthenticated, Unassociated). As long as one link remains in a state other than Not Setup, the corresponding two MLDs are considered connected. If all links are torn down, the MLDs are no longer connected and if states at maintained at MLD level, the state of the MLDs changes to State 1.

According to a third embodiment, an AP MLD may restrict frame exchange for multi-link setup to one of the links i.e. on the link in the highest frequency band (e.g. 6 GHz) to ensure a non-AP MLD is within range in all links. For example, whether frame exchange for multi-link setup is allowed or not allowed on a link may be signaled during the discovery phase (e.g. in the Beacon/Probe Response frames transmitted on a link, or in (Reduced) Neighbor Report elements transmitted on other links etc.). Alternatively, it is also possible that the AP MLD attempts to ensure that all of its affiliated AP's BSSs have more or less the same coverage range by controlling the Transmit power of each affiliated AP. However, this may mean that the Transmit power of the AP associated with the BSS in the lower frequency range (e.g. 2.4 GHz band) may be substantially lower than that of APs associated with the BSS in higher frequency range (e.g. 5/6 GHz). Thus, these may mitigate the difference in range issue but may not be able to mitigate other link quality issues.

Figure 24:
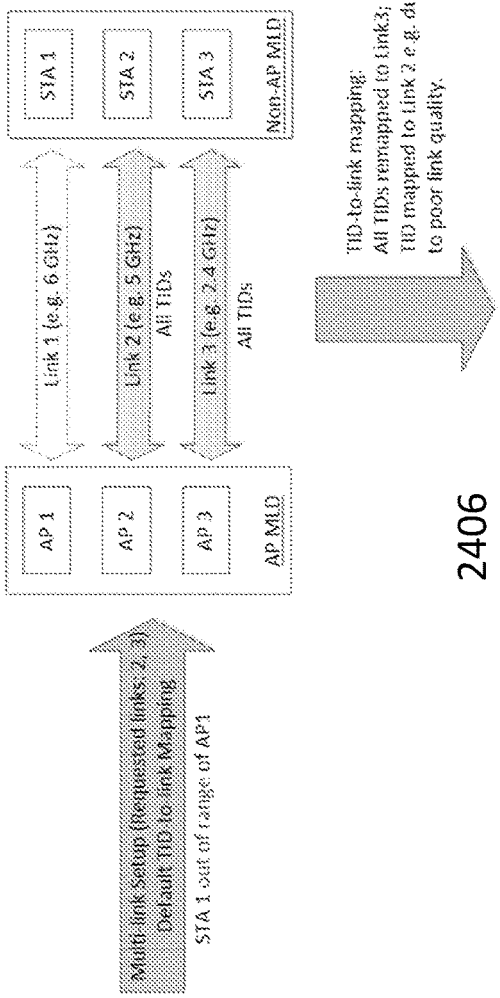
FIG. 24 depicts an illustration of multi-link setup and link maintenance between an AP MLD and a non-AP MLD in accordance with various embodiments.
Figure 24:
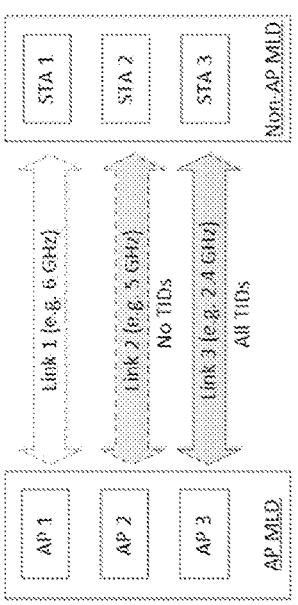
Figure 24:
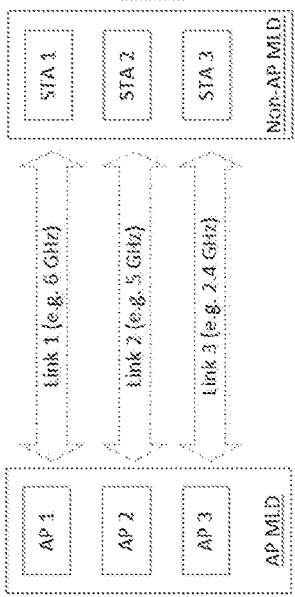
Figure 24:
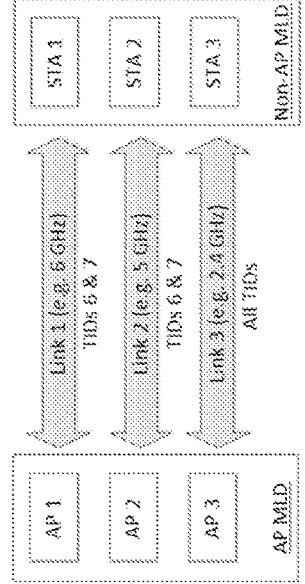

FIG. 24 depicts an illustration 2400 of multi-link setup and link maintenance between an AP MLD and a non-AP MLD. According to an example, at step 2402, both MLDs are capable of operating on links 1, 2 & 3. Before initiating a Multi-link Setup, a non-AP MLD STA may listen for Beacons (passive scan) or perform active scan (exchange Probe request/response frames) on all 3 links and gauge the quality of the links. Non-AP MLD gets authenticated with AP MLD by exchanging Authentication frames or Multi-link Setup (Authentication) frames on one of the links (i.e. link 3). The MLDs are at State 2 at this stage. The non-AP MLD initiates a Multi-Link Setup Request and requests to set up links 2 & 3 by transmitting a Multi-link Setup Request frame on link 3. Link 1 is excluded from the request due to bad channel quality. Non-AP MLD may also include the link quality information of links 2 & 3.

AP MLD considers links 2 & 3 for setup, and decides to setup both links. AP MLD transmits Multi-link Setup Response frame indicating that links 2 & 3 have been set up. At this stage, the Multi-link set consist of link 2 & 3. In this example, AP uses the default TID-to-link mapping on all links and hence the Multi-link Setup Response frame does not include any TID-to-link mapping information. Therefore, at step 2404, AP MLD and non-AP MLD are now associated, and AP MLD records the relevant information of the non-AP MLD as well as relevant information of links 2 & 3. Information of link 1 is not recorded. The MLDs are at State 3 at this stage but the IEEE 802.1X Controlled port is still blocked. Immediately afterwards, IEEE 802.1X Authentication is performed and security keys for links 2 and 3 are generated and distributed to the non-AP MLDs. The MLDs are at State 4 at this stage and the IEEE 802.1X Controlled port is unblocked. Links 2 & 3 are considered Enabled at this stage, while link 1 remains in the Not Setup state. Data and non-Data frames may be exchanged on Links 2 & 3 at this stage.

After some time, AP MLD notices that the link quality of Link 2 has fallen below AP's threshold of required quality for that link. It keeps monitoring the link and since the link quality remains below the required threshold for longer than a certain TIMEOUT duration, the AP decides to disable the link by performing a TID-to-link mapping that does not map any TIDs to link 2. This causes link 2 to be in the Disabled state and all traffic is diverted to link 3, at step 2406.

Thereafter, both AP MLD and non-AP MLD keeps monitoring the links and after a while the link quality of both 1 & 2 improves above the necessary threshold. At this stage either one of the MLD (e.g. non-AP MLD) requests to set up link 1 (i.e. add link 1 to the Multi-link set) by transmitting a Multi-link Setup Request frame. The AP MLD accepts the request and link 1 is added to the Multi-link set. At the same time, AP MLD also maps TIDs 6 & 7 to both links 1 & 2, thereby causing both links 1 & 2 to transition to the Enabled state, at step 2408. Data and non-Data frames may be exchanged on Links 1, 2 & 3 at this stage.

In accordance with another example, the multi-link operations are possible with little variation for the case when the states are maintained at STA level. For example, at step 2402, the affiliated STAs instead of the corresponding MLDs are at State 2. The non-AP MLD only requests to enable links 2 & 3 but it includes the information (i.e. capabilities information) of all 3 links.

The AP MLD considers all 3 links for setup, and decides to setup all 3 links. Thus, the AP MLD transmits Multi-link Setup Response frame indicating that links 1, 2 & 3 have been setup. At this stage, the Multi-link set consist of link 1, 2 & 3. However, the Multi-link Setup Response frame includes TID-to-link mapping element that maps all TIDs to links 2 & 3 only while no TIDs are mapped to link 1. In this case, all 3 affiliated STAs are considered associated (i.e. at State 3) but only links 2 & 3 are in Enabled state, while link 1 is in Setup state at step 2404. Parameters of all links (1 to 3) are recorded by AP MLD and all traditional procedures related to association (AID assignment etc.) are performed for all links. However secret Key generation/distribution are only performed for Enabled links. Alternatively, it is also possible that only affiliated STAs corresponding to Enabled links are considered associated (i.e. State 3) while the affiliated STA corresponding to other links are not considered associated (i.e. State 1 or 2). Parameters of all links (1 to 3) are recorded by AP MLD but all traditional procedures related to association (AID assignment etc.) and secret Key generation/distribution are performed only for Enabled links.

After some time, the AP MLD notices that the link quality of Link 2 has fallen below AP's threshold of required quality for that link. It keeps monitoring the link and since the link quality remains below the required threshold for longer than a certain TIMEOUT duration, the AP decides to disable the link by performing a TID-to-link mapping that does not map any TIDs to link 2. This causes link 2 to be in the Disabled state and all traffic is diverted to link 3, i.e. at step 2406.

In addition to the step 2408 as described in the previous example, AP MLD may also perform procedures related to association (AID assignment etc.) if not done at step 2404 and secret key distribution upon receiving request to enable a link for the first time. Subsequent enabling/disabling would not require this and can be done via TID-to-link mapping.

Figure 25:
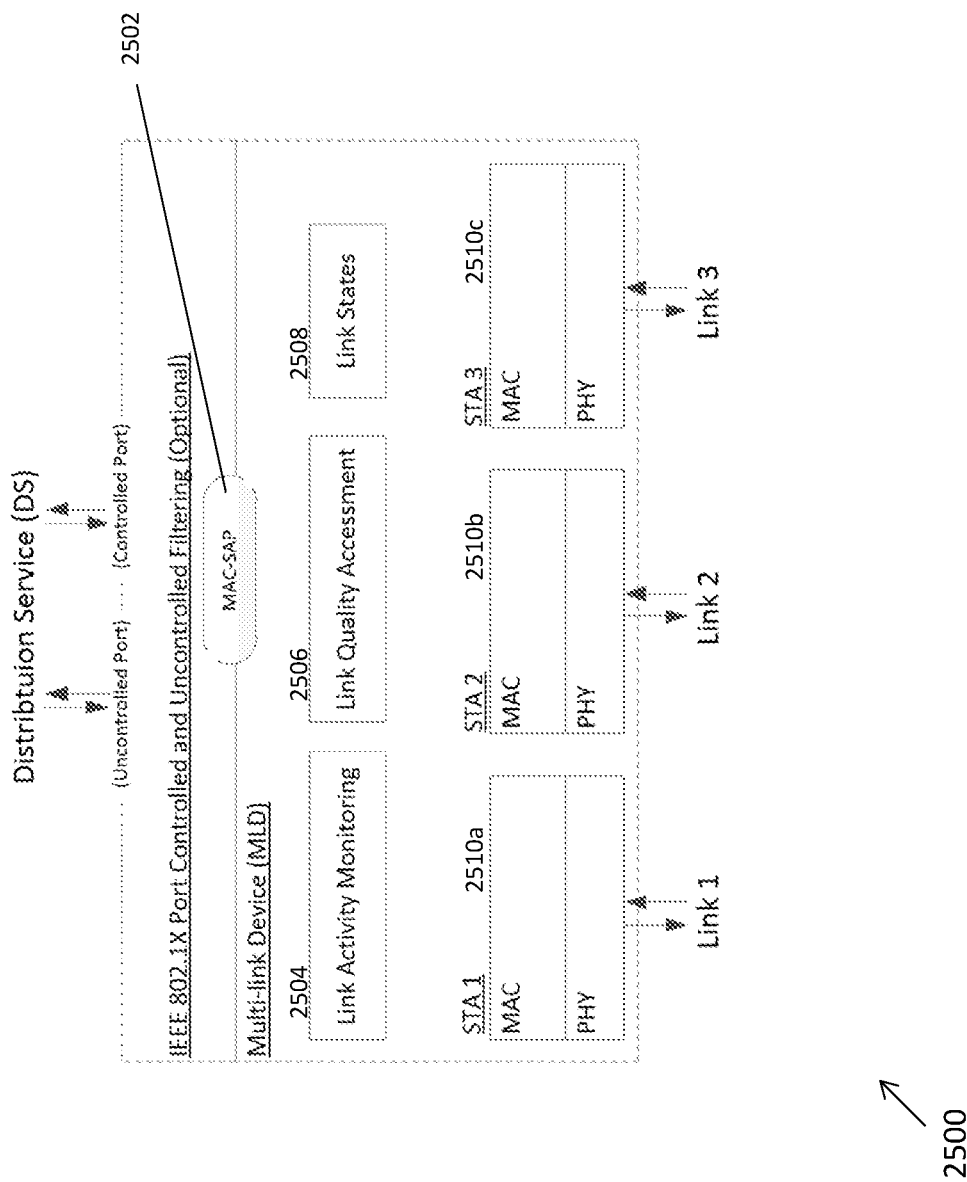
FIG. 25 depicts a schematic of an MLD 2500 in accordance with various embodiments.

FIG. 25 depicts a schematic of an MLD 2500 in accordance with various embodiments. The MLD 2500 comprises a MAC-SAP 2502 for accessing distribution service (DS) via a controlled port and an uncontrolled port, an optional IEEE 802.1X port controlled and uncontrolled filtering, a link activity monitoring module 2504, a link quality assessment module 2506 and a link states module 2508. The MLD 2500 also comprises three affiliated STAs or stations, STA1 2510*a*, STA2 2510*b* and STA3 2510*c*. The STAs each comprise a MAC layer and also a PHY layer from which transmission via Link 1 (for STA1 2510*a*), Link 2 (for STA2 2510*b*) and Link 3 (for STA3 2510*c*) occurs. It will be appreciated that the MLD 2500 may be an AP MLD (with the STAs 1 to 3 being affiliated APs) or a non-AP MLD (with the STAs 1 to 3 being affiliated non-AP STAs), and that the number of links and affiliated STAs or stations may be further expanded.

Figure 26:
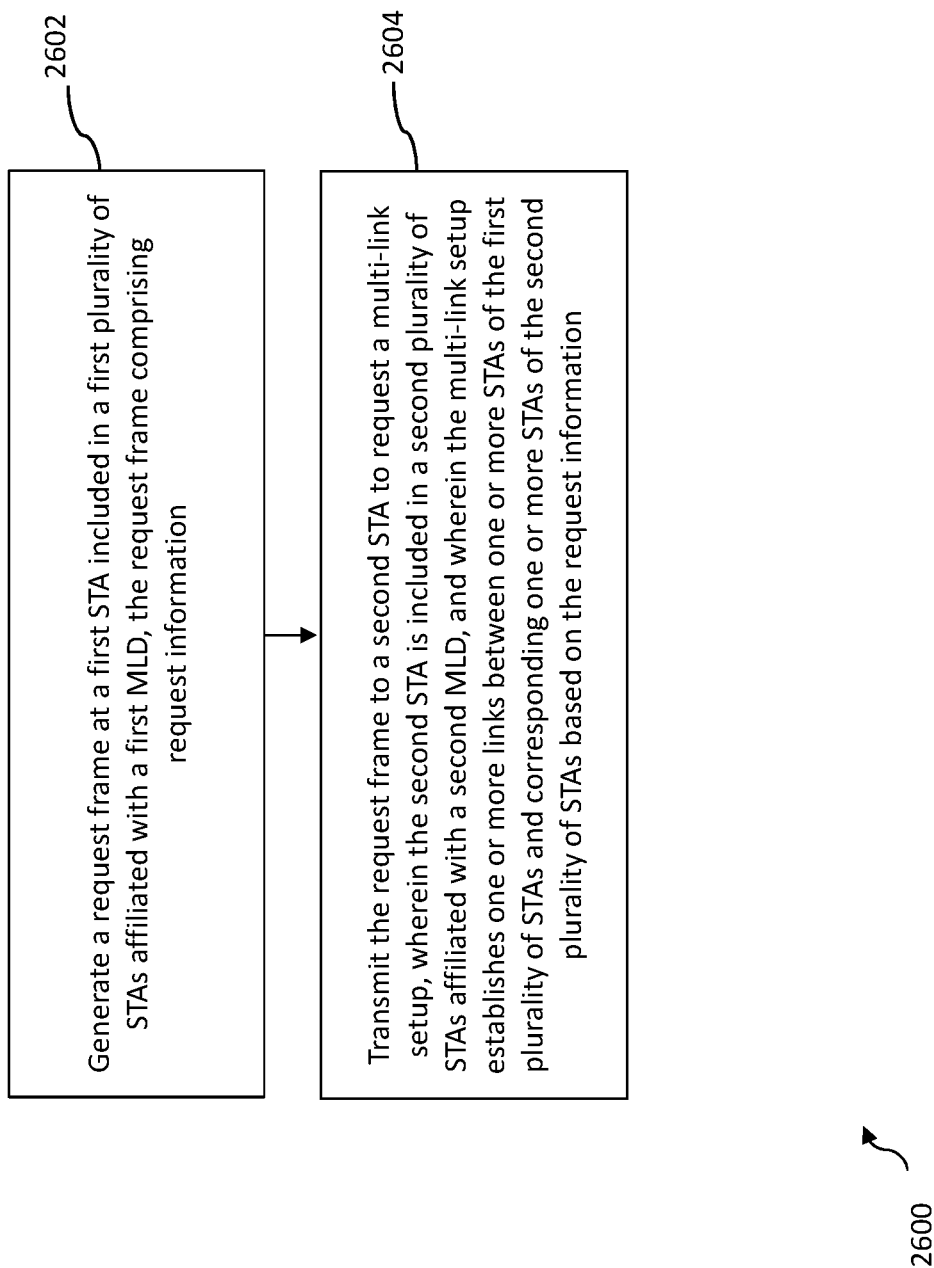
FIG. 26 shows a flow diagram 2600 illustrating a method for multi-link secured retransmission according to various embodiments.

FIG. 26 shows a flow diagram 2600 illustrating a communication method according to various embodiments. At step 2602, a request frame is generated at a first STA included in a first plurality of STAs affiliated with a first MLD, the request frame comprising request information. At step 2604, the request frame is transmitted to a second STA to request a multi-link setup, wherein the second STA is included in a second plurality of STAs affiliated with a second MLD, and wherein the multi-link setup establishes one or more links between one or more STAs of the first plurality of STAs and corresponding one or more STAs of the second plurality of STAs based on the request information.

Figure 27:
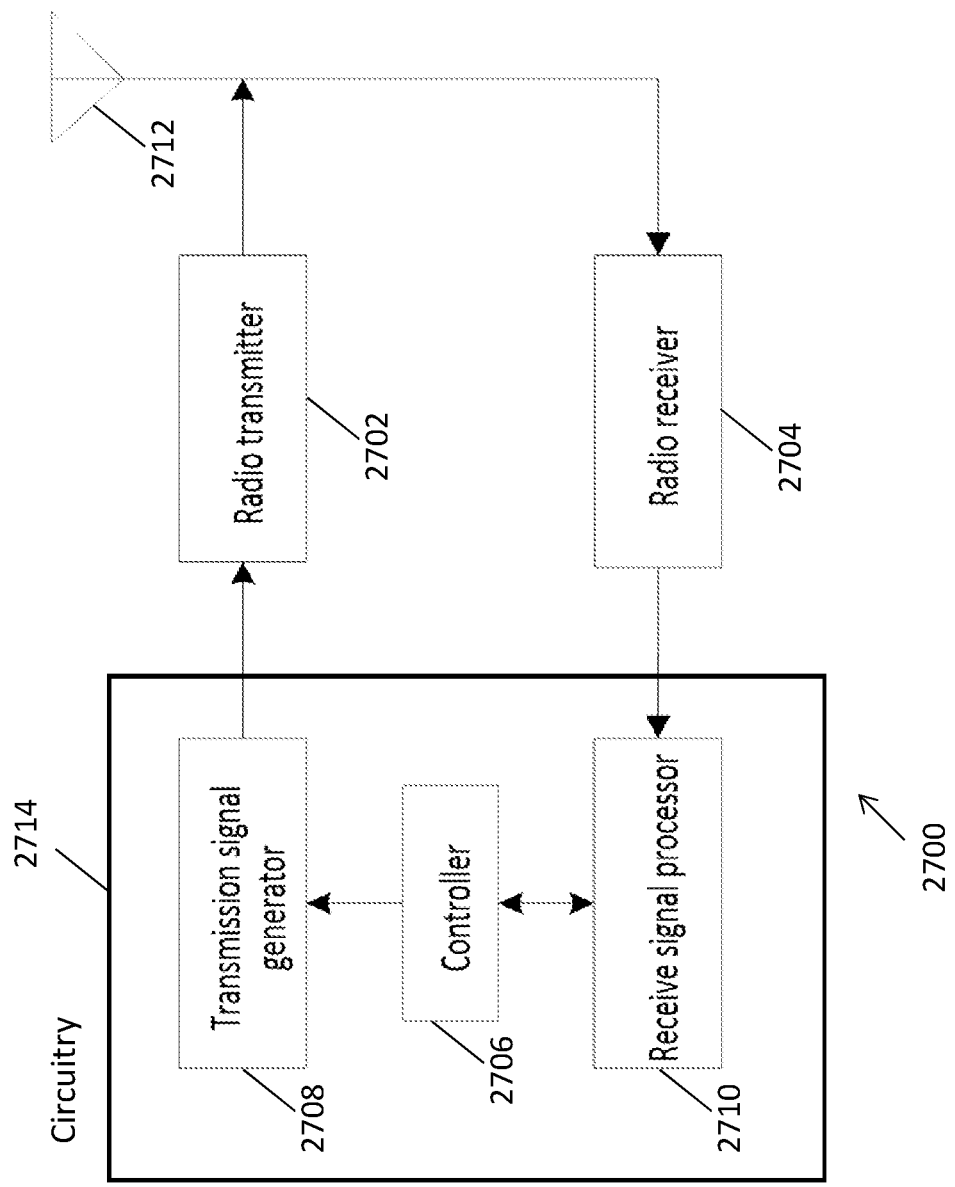
FIG. 27 shows a schematic, partially sectioned view of one of the affiliated STAs of a multi-link device 2700 that can be implemented for multilink communication in accordance with various embodiments.

FIG. 27 shows a schematic, partially sectioned view of a STA 2700 that can be implemented for multilink setup and link maintenance in accordance with the first to third embodiments. The STA 2700 may be implemented as an STA or AP included in a plurality of STAs or APs affiliated with an AP MLD or a non-AP MLD according to various embodiments.

Various functions and operations of the STA 2700 are arranged into layers in accordance with a hierarchical model. In the model, lower layers report to higher layers and receive instructions therefrom in accordance with IEEE specifications. For the sake of simplicity, details of the hierarchical model are not discussed in the present disclosure.

As shown in FIG. 27, the STA 2700 may include circuitry 2714, at least one radio transmitter 2702, at least one radio receiver 2704 and multiple antennas 2712 (for the sake of simplicity, only one antenna is depicted in FIG. 27 for illustration purposes). The circuitry may include at least one controller 2706 for use in software and hardware aided execution of tasks it is designed to perform, including control of communications with one or more other multi-link devices in a MIMO wireless network. The at least one controller 2706 may control at least one transmission signal generator 2708 for generating multi-link action frames to be sent through the at least one radio transmitter 2702 to one or more other STAs or MLDs and at least one receive signal processor 2710 for processing multi-link action frames received through the at least one radio receiver 2704 from the one or more other STAs or MLDs. The at least one transmission signal generator 2708 and the at least one receive signal processor 2710 may be stand-alone modules of the STA 2700 that communicate with the at least one controller 2706 for the above-mentioned functions. Alternatively, the at least one transmission signal generator 2708 and the at least one receive signal processor 2710 may be included in the at least one controller 2706. It is appreciable to those skilled in the art that the arrangement of these functional modules is flexible and may vary depending on the practical needs and/or requirements. The data processing, storage and other relevant control apparatus can be provided on an appropriate circuit board and/or in chipsets.

In various embodiments, when in operation, the at least one radio transmitter 2702, at least one radio receiver 2704, and at least one antenna 2712 may be controlled by the at least one controller 2706. Furthermore, while only one radio transmitter 2702 is shown, it will be appreciated that there can be more than one of such transmitters.

In various embodiments, when in operation, the at least one radio receiver 2704, together with the at least one receive signal processor 2710, forms a receiver of the STA 2700. The receiver of the STA 2700, when in operation, provides functions required for multi-link communication. While only one radio receiver 2704 is shown, it will be appreciated that there can be more than one of such receivers.

The STA 2700, when in operation, provides functions required for multi-link setup and link maintenance. For example, the STA 2700 may be a first STA included in a first plurality of STAs affiliated with a first MLD. The circuitry 2714 may, in operation, generate a request frame, the request frame comprising request information. The transmitter 2702 may, in operation, transmit the request frame to a second STA to request a multi-link setup, wherein the second STA is included in a second plurality of STAs affiliated with a second MLD, and wherein the multi-link setup establishes one or more links between one or more STAs of the first plurality of STAs and corresponding one or more STAs of the second plurality of STAs based on the request information.

The request information may identify the one or more STAs of the first plurality of STAs. The request frame may further comprise information about quality of wireless channels for each of the one or more links. The first plurality of STAs may be configured to collect information about quality of wireless channels for each of the one or more links prior to transmitting the request frame, and wherein the quality of wireless channel comprises one or more of link margin, path loss, receive signal strength indication (RSSI) and receive channel power indication (RCPI). The request information may further comprise information about quality of wireless channels for a plurality of links that can be set up between the first plurality and second plurality of STAs, and wherein the quality of wireless channels are set to implicitly indicate the one or more links to be set up. The first MLD may be a non-AP MLD and the second MLD may be an AP MLD.

For example, the STA 2700 may be a second STA included in a second plurality of STAs affiliated with a second Multi-link Device (MLD). The receiver 2704 may, in operation, receive a request frame from a first STA, wherein the first STA is included in a first plurality of STAs affiliated with a first MLD, and wherein the request frame comprises request information and is requesting for a multi-link setup that establishes one or more links between one or more STAs of the first plurality of STAs and corresponding one or more STAs of the second plurality of STAs based on the request information. The transmitter 2702 may transmit a response frame to the first STA to inform the result of the multi-link setup, wherein the response frame carries information of the one or more links that have been established between the one or more STAs of the first plurality of STAs and the corresponding one or more STAs of the second plurality of STAs.

The request information may identify the one or more STAs of the first plurality of STAs. The information of the one or more links may comprise operating parameters of the one or more links and capability information of the one or more STAs of the second plurality of STAs corresponding to the one or more links. The response frame may further comprise information of Traffic Identifiers (TID) that are mapped to each of the one or more links, and wherein the first plurality of STAs are only allowed to transmit, on each link, frames that belong to one or more TIDs that are mapped to the link. The request information may comprise information about quality of wireless channels of the one or more links, and wherein the second MLD is configured to decide whether or not to establish the one or more links based on the information. The response frame may further comprise information related to block ack parameters for an established link. The second MLD may be an AP MLD and the first MLD may be a non-AP MLD, wherein a frame comprising information of a common MAC Address that identifies the AP MLD may be transmitted by a STA included in the second plurality of STAs to advertise the AP MLD, the frame being one of a Beacon frame or a Probe Response frame. A frame indicating an AP among the second plurality of STAs to which the request frame should be addressed may be transmitted by a STA included in the second plurality of STAs to advertise the AP MLD, the frame being one of a Beacon frame or a Probe Response frame.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication device.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication device include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication device is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication device may comprise an apparatus such as a controller or a sensor which is coupled to a communication apparatus performing a function of communication described in the present disclosure. For example, the communication device may comprise a controller or a sensor that generates control signals or data signals which are used by a communication apparatus performing a communication function of the communication device.

The communication device also may include an infrastructure facility, such as a base station, an access point, and any other apparatus, device or system that communicates with or controls apparatuses such as those in the above non-limiting examples.

A non-limiting example of a station may be one included in a first plurality of stations affiliated with a multi-link station logical entity (i.e. such as an MLD), wherein as a part of the first plurality of stations affiliated with the multi-link station logical entity, stations of the first plurality of stations share a common medium access control (MAC) data service interface to an upper layer, wherein the common MAC data service interface is associated with a common MAC address or a Traffic Identifier (TID).

Thus, it can be seen that the present embodiments provide communication devices and methods for operation over multiple links in order to fully realize the throughput gains of multi-link communication, in particular for multi-link secured retransmissions.

While exemplary embodiments have been presented in the foregoing detailed description of the present embodiments, it should be appreciated that a vast number of variations exist. It should further be appreciated that the exemplary embodiments are examples, and are not intended to limit the scope, applicability, operation, or configuration of this disclosure in any way. Rather, the foregoing detailed description will provide those skilled in the art with a convenient road map for implementing exemplary embodiments, it being understood that various changes may be made in the function and arrangement of steps and method of operation described in the exemplary embodiments and modules and structures of devices described in the exemplary embodiments without departing from the scope of the subject matter as set forth in the appended claims According to an example, there is a second STA included in a second plurality of STAs affiliated with a second Multi-link Device (MLD), the second STA comprising: a receiver, which in operation, receives a request frame from a first STA, wherein the first STA is included in a first plurality of STAs affiliated with a first MLD, and wherein the request frame comprises request information and is requesting for a multi-link setup that establishes one or more links between one or more STAs of the first plurality of STAs and corresponding one or more STAs of the second plurality of STAs based on the request information; and a transmitter, which in operation, transmits a response frame to the first STA to inform the result of the multi-link setup, wherein the response frame carries information of the one or more links that have been established between the one or more STAs of the first plurality of STAs and the corresponding one or more STAs of the second plurality of STAs.

The second STA according to an example, wherein the request information identifies the one or more STAs of the first plurality of STAs.

The second STA according to an example, wherein the information of the one or more links comprises operating parameters of the one or more links and capability information of the one or more STAs of the second plurality of STAs corresponding to the one or more links.

The second STA according to an example, wherein the response frame further comprises information of Traffic Identifiers (TID) that are mapped to each of the one or more links, and wherein the first plurality of STAs are only allowed to transmit, on each link, frames that belong to one or more TIDs that are mapped to the link.

The second STA according to an example, wherein the request information comprises information about quality of wireless channels of the one or more links, and wherein the second MLD is configured to decide whether or not to establish the one or more links based on the information.

The second STA according to an example, wherein the response frame further comprises information related to block ack parameters for an established link.

The second STA according to an example, wherein the second MLD is an AP MLD and the first MLD is a non-AP MLD; and wherein a frame comprising information of a common MAC Address that identifies the AP MLD is transmitted by a STA included in the second plurality of STAs to advertise the AP MLD, the frame being one of a Beacon frame or a Probe Response frame.

The second STA according to an example, wherein a frame indicating an AP among the second plurality of STAs to which the request frame should be addressed is transmitted by a STA included in the second plurality of STAs to advertise the AP MLD, the frame being one of a Beacon frame or a Probe Response frame.

The invention claimed is:

1. A non-Access Point (non-AP) Multi-Link Device (MLD) comprising:
   circuitry, which, in operation, generates an Association Request frame that includes a MLD MAC Address field indicating a MLD MAC address of the non-AP MLD and a link-specific MAC address subfield indicating a MAC address that corresponds to one of requested links; and
   a transmitter, which, in operation, transmits the Association Request frame to an Access Point (AP) MLD to request a multi-link setup between the non-AP MLD and the AP MLD.

2. The non-AP MLD according to claim 1, wherein the Association Request frame includes a Multi-Link element that includes a common information field for specifying a MAC address of the non-AP MLD.

3. The non-AP MLD according to claim 1, wherein the Association Request frame includes a Multi-Link element that includes one or more link information fields, each link information field indicating one of the requested links and its link specific information.

4. The non-AP MLD according to claim 1, wherein the link specific information includes operational parameters of the requested links.

5. The non-AP MLD according to claim 1, wherein prior to the multi-link setup,
   the circuitry, in operation, generates an Authentication frame comprising a MAC address of the non-AP MLD; and
   the transmitter, in operation, transmits the Authentication frame to the AP MLD for multi-link authentication.

6. The non-AP MLD according to claim 1, wherein the transmitter, in operation, transmits a Multi-link Re-setup Request frame for establishing a new link between the non-AP MLD and the AP MLD, the new link being independent of established one or more links.

7. The non-AP MLD according to claim 1, wherein the transmitter, in operation, transmits the Association Request frame on a link that the non-AP MLD desires to use as part of the multi-link setup.

8. The non-AP MLD according to claim 1, comprising
   a receiver, which, in operation, receives an Association Response frame that indicates one or more links that are accepted by the AP MLD.

9. The non-AP MLD according to claim 8, wherein the Association Response frame is received on a link on which the Association Request frame is transmitted.

10. The non-AP MLD according to claim 1, wherein the non-AP MLD includes a plurality of associated stations (STAs) and the AP MLD includes a plurality of associated APs, and multiple links are to be set up between the plurality of associated STAs and the plurality of associated APs over different frequency channels.

11. A communication method for a non-Access Point (non-AP) Multi-Link Device (MLD), the communication method comprising:

generating an Association Request frame that includes a MLD MAC Address field indicating a MLD MAC address of the non-AP MLD and a link-specific MAC address subfield indicating a MAC address that corresponds to one of requested links; and transmitting the Association Request frame to an Access Point (AP) MLD to request a multi-link setup between the non-AP MLD and the AP MLD.

12. The communication method according to claim 11, wherein the Association Request frame includes a Multi-Link element that includes a common information field for specifying a MAC address of the non-AP MLD.

13. The communication method according to claim 11, wherein the Association Request frame includes a Multi-Link element that includes one or more link information fields, each link information field indicating one of the requested links and its link specific information.

14. The communication method according to claim 11, wherein the link specific information includes operational parameters of the requested links.

15. The communication method according to claim 11, comprising:

prior to the multi-link setup, generating an Authentication frame that comprises a MAC address of the non-AP MLD; and transmitting the Authentication frame to the AP MLD for multi-link authentication.

16. The communication method according to claim 11, comprising:

transmitting a Multi-link Re-setup Request frame for establishing a new link between the non-AP MLD and the AP MLD, the new link being independent of established one or more links.

17. The communication method according to claim 11, wherein the Association Request frame is transmitted on a link that the non-AP MLD desires to use as part of the multi-link setup.

18. The communication method according to claim 11, comprising:

receiving an Association Response frame that indicates one or more links that are accepted by the AP MLD.

19. The communication method according to claim 18, wherein the Association Response frame is received on a link on which the Association Request frame is transmitted.

20. The communication method according to claim 11, wherein the non-AP MLD includes a plurality of associated stations (STAs) and the AP MLD includes a plurality of associated APs, and multiple links are to be set up between the plurality of associated STAs and the plurality of associated APs over different frequency channels.

* * * * *